(12) United States Patent   (10) Patent No.: US 6,198,473 B1
Armstrong   (45) Date of Patent: Mar. 6, 2001

(54) COMPUTER MOUSE WITH ENHANCE CONTROL BUTTON (S)

(76) Inventor: Brad A. Armstrong, P.O. Box 1419, Paradise, CA (US) 95967

(*) Notice: Subject to any disclaimer, the term of this patent is extended or adjusted under 35 U.S.C. 154(b) by 0 days.

(21) Appl. No.: 09/167,314

(22) Filed: Oct. 6, 1998

(51) Int. Cl.$^7$ .................................................... G09G 5/08
(52) U.S. Cl. .............................................................. 345/163
(58) Field of Search ..................................... 345/163, 164, 345/165, 166, 167, 168, 169

(56) References Cited

U.S. PATENT DOCUMENTS

| | | | |
|---|---|---|---|
| 3,806,471 | 4/1974 | Mitchell | 252/519.31 |
| 4,313,113 | * 1/1982 | Thornburg | 345/159 |
| 4,315,238 | 2/1982 | Eventoff | 338/99 |
| 5,313,229 | 5/1994 | Gilligan et al. | 345/157 |
| 5,457,478 | * 10/1995 | Frank | 345/158 |
| 5,530,455 | 6/1996 | Gillick et al. | 345/163 |
| 5,657,051 | 8/1997 | Liao | 345/163 |
| 5,659,334 | 8/1997 | Yaniger et al. | 345/156 |
| 5,790,102 | * 8/1998 | Nassimi | 345/163 |
| 5,854,624 | * 12/1998 | Grant | 345/169 |
| 5,883,619 | * 3/1999 | Ho et al. | 345/163 |
| 5,910,798 | * 6/1999 | Kim | 345/163 |
| 5,999,084 | * 12/1999 | Armstrong | 338/114 |
| 6,020,884 | * 2/2000 | MacNaughton et al. | 345/329 |
| 6,049,812 | * 4/2000 | Bertram et al. | 707/516 |

* cited by examiner

*Primary Examiner*—Richard Hjerpe
*Assistant Examiner*—Kevin M. Nguyen

(57) ABSTRACT

A desktop operated computer control mouse including a housing, electronic circuitry within the housing, a user manipulable rotatable ball for pointing control, a plurality of finger depressible buttons exposed on the housing and interfacing with sensors electrically connected with the circuitry. At least some of the finger depressible buttons are for user selection of signals to be sent to the computer for window or screen scroll control, and are associated with sensor(s) which are pressure-sensitive analog sensors structured for varying electrical conductance through at least three readable states or values. The readable states are dependant upon depressive pressure applied to the sensor(s) through the finger depressible button(s). The circuitry is structured to read the at least three readable states of the pressure-sensitive analog sensor(s) and to produce signals representing the state or value of the sensor(s). In one embodiment, the analog sensor(s) are elastomeric dome-cap sensor(s) including pressure-sensitive variable-conductance material positioned over proximal circuit elements of the circuitry. In another embodiment the sensors are packaged sensors including button depressible concavo-convexed conductive disks positioned to compress pressure-sensitive variable-conductance material forming at least a portion of an electrical flow path through the packaged sensor. The analog sensors are associated with window or screen scroll control, and provide user determinable scroll rates dependant upon pressure applied by the user through ergonomically correct finger depressible buttons. Methods of use and manufacture are also disclosed.

28 Claims, 19 Drawing Sheets

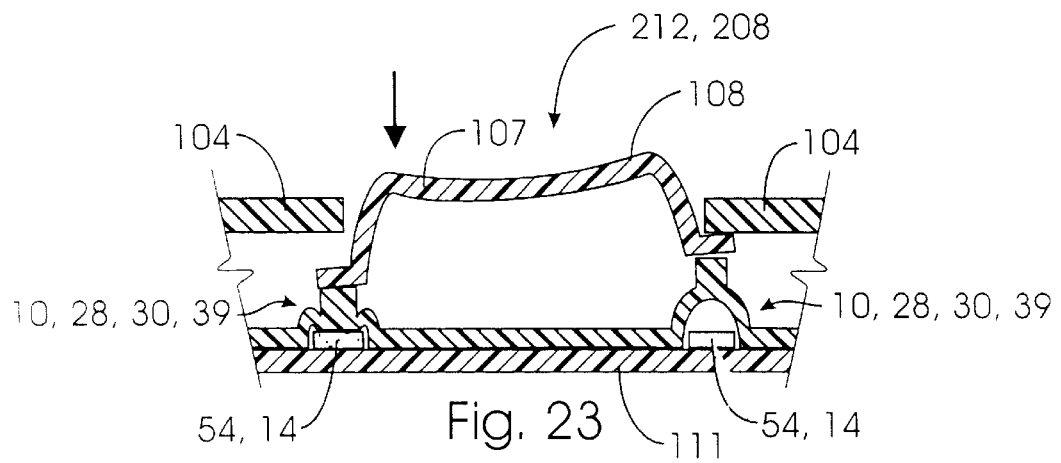
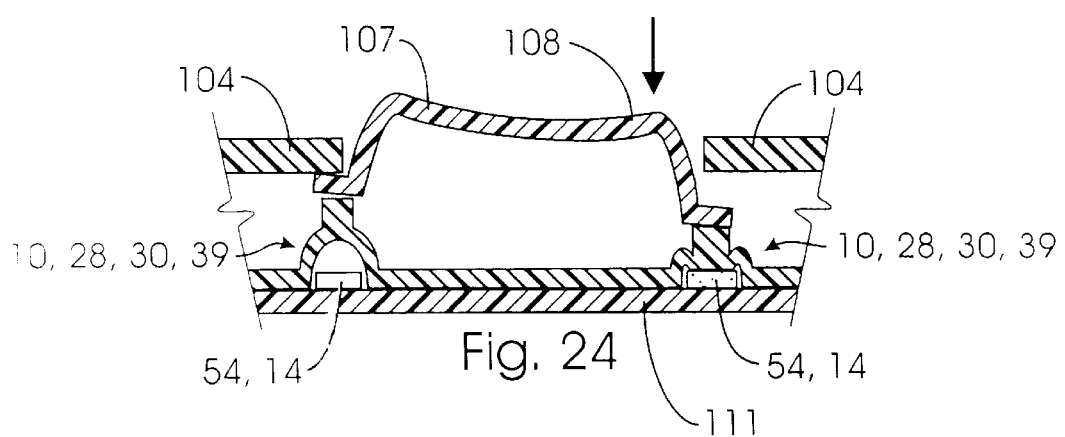
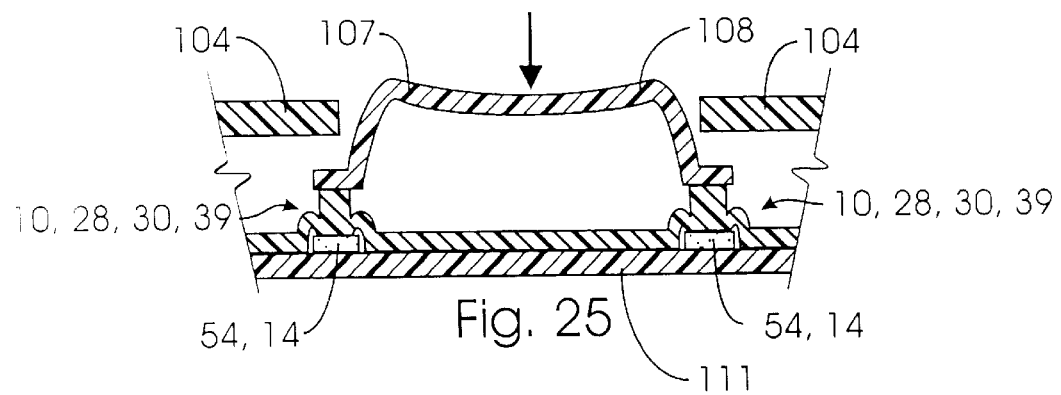

COMPUTER MOUSE WITH ENHANCE CONTROL BUTTON (S)

BACKGROUND OF THE INVENTION

1. Field of the Invention

The present invention relates to desk top computer control devices such as desk top operated mice, of the type having a rotatable ball for pointing control, and which further include depressible buttons which can be depressed inward to a main housing by the user's finger for scrolling applications in Windows or the like.

2. Description of the Related Prior Art

Prior art desktop operated computer control devices for pointing control and for controlling certain functions of computers, such as the mouse type desktop operated computer control device, have been used for years, the structures of which and means for interfacing with computers and computer programs being well understood by those skilled in the art.

The term "desktop" associated with desktop mouse and/or desktop operated computer control device(s) as herein used has the meaning of the mouse (computer control device) resting on top of or being supported on a desktop or like stationary surface when operated for controlling the pointer and other functions of the computer, thereby the user's hand and arm remain in a rested or supported position, thus eliminating the undesirable "tired arm syndrome" associated with continuously holding aloft hand supported computer control devices.

A typical prior art desktop mouse comprises a housing usually small enough to be graspable and operable in a single hand. Within the housing is a rotatable ball in-part exposed through a bottom opening of the housing, so that movement of the housing across a surface such as a desktop rolls the ball which is engaged with the surface. Ball movement detectors within the housing, commonly being rotary encoders, such as optical encoders, detect movement of the ball relative to the housing, and electronics in the housing transmit information about ball movement to the computer, via wire (cables) or wireless communication. The computer uses the information in a manner appropriate with the software setup, but typically a cursor or pointer shown on the monitor is moved in the direction of the housing movement.

The rotatable pointer control ball arrangement of a conventional desktop mouse is a certain position type pointer control device or arrangement. Such certain position type pointer control provides advantages (particularly when associated with the limited positions possible on a monitor screen) because a certain rotational position of the ball can directly correspond to a certain location on a computer monitor screen. Pointer control on hand supported computer control devices, sometimes referred to as remote controllers or remote mice such as sold by Interlink Electronic, Inc. of Camarillo, Calif., USA, are operable via a variable speed pointer control button (and possibly scroll control button), yet such devices do not contain the very accurate rotatable ball for pointing control, thus such devices having no rotatable ball for pointing control are considered inferior and not to be within the scope of the herein described invention or the legal claims and their equivalents for claims that include a rotatable ball in the claim. The certain pointing control of a rotatable ball pointing device is clearly superior to any device having pointing control embodied as a vector output device such as depressible buttons or joystick type of manipulated input.

A desktop trackball is a very similar device to a desktop mouse but with the rotatable ball exposed on the top of the housing for rotating by hand, the housing being stationary in use atop a desktop, and thus the term mouse and trackball are herein interchangeable and usable as synonyms of one another, as this disclosure teaches improvement of desktop ball type pointer control devices, and specifically such rotatable ball type devices with depressible buttons dedicated for scrolling control.

Exposed on the exterior top of the housing of the typical or conventional desktop mouse is a plurality of finger depressible selection buttons, commonly two buttons and sometimes more than two, the two buttons commonly referred to as a right select button and a left select button. The finger depressible buttons interface with momentary-On sensors or sensors used only as momentary-On On/Off sensors by the electronic circuitry. The momentary-On sensors are simple On/Off switches which assume a normally off or open position, and which interface between the exposed buttons and the circuitry within the housing. The momentary-On sensors typically are positioned between the exposed button portions and the circuitry which is typically on a circuit board or member sheet or the like. The exposed depressible buttons allow interfacing of a human digit such as a finger or thumb in a natural movement with the electrical switches to close the switches in order to control the circuitry to actuate (or deactuate) a function of the computer via a function-control signal generated electronically in the circuitry and communicated to the computer.

In more recent years, computer desktop mice with pointer control balls have been developed to include exposed finger depressible buttons associated with electrical switches or sensors operable for screen or window scrolling control, such switches or sensors being either structured such that they can be used only as momentary-On only On/Off switches, or being used in conjunction with the associated circuitry such that the switches are only read as having two readable states, On and Off, or activated and de-activated. Such Window or screen scrolling switches allow scrolling vertically up and down if two switches are used, one switch for each direction, and both vertically and horizontally (left and right) if four switches are used.

Such prior art computer desktop mice which include window or screen scrolling finger depressible buttons associated with switches (sensors) generally use one of two types of common switches, i.e., packaged switches or elastomeric dome-cap type switches.

The first type of switch is a packaged momentary-On only On/Off switch capable of providing only two readable states. A typical packaged momentary-On only On/Off switch generally comprises a depressible button-like actuator movably retained to a housing, a pair of electrically conductive proximal circuit elements each in-part within the housing and each in-part exposed exterior of the housing to allow connection thereof to a circuit board, the proximal circuit elements being normally separated from one another within the housing until the depressible button is depressed sufficiently to bring an electrically conductive concavo-convex resilient metal disk downward to contact across both the proximal circuit elements to in effect serve as a conductive link to close the circuit. Upon release of the depressive pressure on the button, the conductive concavo-convex metal disk being resilient, returns to a raised normal position wherein the electrical path across the two proximal circuit elements is again rendered open. The metal disk typically remains in constant contact with one of the proximal circuit elements. A prior art computer desktop mouse which I have seen on the market which uses such packaged switches for use in control of scrolling functions is sold under the tradename of WEB MOUSE with the mouse retail packaging further including MAXXTRO and MUS8 printed thereon.

The second type of switch commonly employed in prior art computer desktop mice which include window or screen scrolling finger depressible buttons associated with such sensors is an elastomeric injection molded dome-cap switch or sensor. A prior art computer desktop mouse currently on the market which uses such elastomeric injection molded dome-cap switches or sensors for use in control of scrolling functions through depressible buttons is sold under the tradename of NET MOUSE by KYE INTERNATIONAL. U.S. Pat. No. 5,657,051 issued Aug. 12, 1997 to J. Liao and assigned to KYE International, describes such a mouse but with the dome-cap switches (only On/Off switches) utilized to control pointer movement along a third or "Z" axis.

The Liao mouse additionally includes the limitation of always having a pivot on the "Z" key preventing simultaneous actuation of the two "Z" axis switches, thus depriving the user of an additional benefit of being able to press down on the center of the Liao's "Z" key whereby both switches would be actuated simultaneously for use in defining a third function or control output, for example the third control output (which Liao's pivot prevents) may toggle select a mode in which movement of the rotatable ball controls scrolling.

As utilized by Liao, and all other known prior art, elastomeric injection molded dome-cap momentary-On switches (sensors) are well known and widely used as On/Off switches incorporated in many different devices. In all known prior art where the elastomeric dome-cap sensor is employed, the molded dome-cap is always used as a component of a sensor having a simple conductor with a single electrical threshold serving as a simple make or break (closed or open) electrical switch in a circuit. The term elastomeric is used to describe any rubber-like material, whether natural or synthetic.

Structurally, the prior art elastomeric injection molded dome-cap carries a normally raised conductive element or disk referred to as a pill or a carbon pill. The conductive pill is herein sometimes referred to as the "active element". The active element in prior art elastomeric injection molded dome-cap sensors is commonly made of a binder of elastomeric or rubbery material binding carbon particles, carbon containing material or like conductive material. The active element is normally connected to the top inside of the non-conductive elastomeric dome-cap and above two proximal highly conductive elements or traces so that with depression of the dome-cap, such as with pressure applied by a finger or finger depressible button, the active element is moved with the collapsing dome-cap into contact with both proximal conductive elements and closes an otherwise normally open circuit. Since the injection molded dome-cap is resilient, with release of pressure on the dome-cap it returns to a raised position carrying the active element with it to open the circuit. Electronic circuitry associated with the two proximal conductive elements, which are either bridged or not bridged by the active element of the elastomeric dome-cap, is circuitry which in the prior art has always been structured only to detect or read an electrical threshold event, i.e., an electrical open or closed, only On/Off states across the proximal conductive elements.

As those skilled in the art will appreciate, most, but not all elastomeric injection molded dome-caps when depressed produce a soft snap, tactile break-over, which is a user discernable tactile feedback. This tactile feedback occurs when the dome-cap is depressed beyond a given point; the point being where a mechanical threshold is crossed and the tactile "snap" is produced. The snap defining the tactile sensation occurs just prior to the temporary collapse of the dome-cap structure, thus the active element is brought into contact with the two proximal conductive elements. The tactile sensation is perceived by the user as occurring at the same time the sensor is activated, which in the prior art is when the switch is closed. The switch remains closed until such time as the user releases pressure on the dome-cap, at which time the dome-cap being made of elastomeric material returns to a raised position carrying the active element with it and off of the proximal conductive elements. The elastomeric injection molded dome-cap typically again produces a tactile sensation as it moves upward crossing the mechanical snap-through threshold. The metal concavo-convexed disk of packaged switches as above described also typically produce a tactile sensation when depressed and also when released.

Elastomeric injection molded dome-caps are typically molded primarily of thermoset rubber, are one-piece absent joints or seams, and provide excellent durability for a very low cost. The active element in the prior art is typically adhered to the inside top of the dome-cap during the injection molding phase of manufacturing the dome-cap.

Another type of electrical sensor employed on desktop mice for scrolling control is a rotary encoder type such as a rotary optical encoder functional with a bi-directionally rotatable exposed wheel as described in U.S. Pat. No. 5,530,455 issued Jun. 25, 1996 to W. G. Gillick. The Gillick prior art rotatable scroller wheel is not considered an optimal interface between a human digit and electrical sensor because of the unfamiliar or non-conventional rotatable aspect requiring a finger motion substantially different than a depressible button, and further because of the rather high cost of optical encoders, and additionally the rotatable wheel is not optimum as a scroll controller for moderate to high speed scrolling because scrolling speed is determined by wheel rotation speed, and high wheel rotation speed is difficult to achieve by finger manipulation. Furthermore, in a low cost mouse, additional high cost optical encoders may be cost prohibitive.

U.S. Pat. No. 5,313,229 issued May 17, 1994 to F. G. Gilligan et al describes a prior art computer desktop mouse with a scroll control lever on the side of the housing and coupled to optical encoders for allowing the user to scroll screens in multiple directions and at multiple user determinable scroll rates dependant upon which direction the level is moved and where it is held by the thumb of the grasping hand. The Gilligan et al lever-actuated scroll control is considered less than optimal because of the high costs of optical encoders and because of the un-familiar and awkward nature of a thumb lever positioned extending outward from a side of the mouse housing. The Gilligan et al thumb lever is designed to be controlled with thumb movement by the same thumb which is supposed to be aiding in grasping the housing, an operation which is difficult and un-familiar, and thus considered less than optimal. Also, the Gilligan device allows for only one axis of simultaneous control, not two axes.

A prior art desktop mouse taught in U.S. Pat. No. 5,659,334 issued Aug. 19, 1997 to S. L. Yaniger et al and marketed by IBM includes a short joystick lever in the forward top center of the mouse for use in screen scrolling control in two axes or four directions with user determinable variable speed. The short joystick is sized for and intended to be manipulated by a single finger used to push the stick forward, left or right, or to pull the stick rearward. A short finger actuated joystick is considered less than an optimal finger-to-sensor interface primarily because the pushing of the stick to the left or to the right with a finger of a hand gripping the mouse is difficult and not an ergonomically ideal movement of the finger. A natural and ergonomically correct movement of the finger is curling the finger toward the palm, a movement used with mice finger depressible buttons as the action to depress the button inward to the housing, and not the sideways lateral movement necessary to operate a short joystick.

The typical functionality of a desktop mouse scroll control is that assuming proper software is used, activation of a desktop mouse scroll control depressible button, thumb-lever, joystick or roller causes scrolling of the active window or viewed screen. Such scrolling control eliminates the need for the user to carefully locate the pointer on a small window elevator showing on the monitor and to maintain the pointer on the elevator during scrolling.

While screen or window scrolling buttons of the type which are finger depressible inward to the housing, much like the very common and ergonomically correct depressible right and left select buttons common on most all prior art computer mice, provide substantially greater ease in scrolling through windows or screens compared to using a roller, thumb-lever or joystick as described above, there still exist significant shortcomings in the art pertaining to finger depressible button actuated scrolling controls on the desktop mouse having a pointer control ball.

One such shortcoming is that since the finger depressible buttons for scrolling control are associated with On/Off switches or circuitry and switches arranged to provide or read only two readable states of each of the switches, then when initiated, scrolling is at a predetermined scroll rate, the rate not determinable by the user by manipulation of varying pressure to the depressible scroll buttons, and thus the rate may be and often is either too slow or too fast for the user's purposes and liking. While finger depressible buttons, i.e., push buttons actuated by finger movement in a natural, slight finger-curling toward the palm motion, for scrolling control are highly desirable on a desktop mouse because of their ease of operation, natural and ergonomic finger movement, and familiarity to a large percentage of the population who have become accustomed to ergonomically correct push buttons for left and right selection functions on desktop mice, the predetermined scroll rate associated with such buttons is a significant shortcoming in such a computer control desktop mouse.

Clearly, all prior art desktop computer mice having a rotatable ball for precise pointer control, fail to deliver optimum user control of window or screen scrolling by failing to deliver user determinable variable scroll rate in a low cost, ergonomically correct, familiar and desirable finger depressible button arrangement.

SUMMARY OF THE INVENTION

The present invention, in one preferred form, is an improved desktop operated mouse of the type having a rotatable pointer control ball and finger depressible buttons for providing a human user increased control over computer window or screen scrolling. The present improved desktop mouse utilizes analog sensors associated with window or screen scrolling in place of some or in addition to the typical momentary-On switches associated with finger depressible buttons on the desktop mouse. In combination with the analog sensors is circuitry for reading at least three readable states, analog values or conductance levels of each of the analog sensors, the states dependent upon depressive pressure applied to a finger depressible button associated with each analog sensor. The circuitry is structured to read an immediate, instant or current state or value of the analog sensors and to communicate representative scroll control signals to the associated computer. The scroll control signals are thus of varied value causing a varied scrolling rate which is dependent on the level of pressure applied to a depressible button by the user.

With the analog sensors as scroll control depressible buttons on the desktop mouse in accordance with the invention and functional with appropriate circuitry applied with cooperative computer program/software operating in the computer, the user is provided variable scroll rate control dependant upon the degree of depressive pressure he or she applies to the scroll button associated with the analog sensor(s) of the desktop mouse, and this through an ergonomically correct finger depressible button(s) format. Low depressive pressure on a scroll-up button provides a low or slow rate of scrolling upward through the screen or active window, and relatively high depressive pressure on the scroll-up button provides a high rate of scrolling. Likewise, low depressive pressure on a scroll-down button provides a slow rate of scrolling downward, and relatively high depressive pressure on the scroll-down button provides a high rate of scrolling downward. A like arrangement is preferably provided for a scroll-left button and a scroll-right button on the present desktop mouse. Preferably, many different user determinable scroll rates are provided between low and high pressure on the associated scroll button so that the user is provided, for example, very slow, slow, medium, fast and very fast scroll rates. In a digital bit-stream, using 7 bits as a scroll control signal representing a variable scroll rate analog sensor as herein taught, 128 different scroll rates can be provided the user through a single finger depressible button. Such an arrangement provides the user vastly improved scrolling control by allowing the user to apply low pressure to slowly scroll, or to apply high pressure to scroll very rapidly through the screen or screens, and then to reduce the applied pressure to the button to reduce the rate of scrolling in order to stop easily and precisely on a desired target or within a desired area or screen. The depressible button format is provided in a familiar and ergonomically correct depressible button arrangement with the buttons positioned forward of a palm rest area on the mouse to allow the fingers of the resting and thus in-part supported hand to operate the buttons through a natural and ergonomically correct slight curling of the fingers toward the palm.

In another preferred embodiment of computer control device, i.e., mouse for controlling certain functions of a computer, the analog sensor(s) serve a dual role, one role may be used as a previous link or web site address Back or Forward switch for moving backward or forward to a previously viewed screen or address or menu of previous screens or addresses, and another role as a variable or analog sensor for variable rate window or screen scroll control. For example, a computer may be controlled with the dual role analog sensors in the following manner: pressing and immediately releasing a dual role sensor button can be interpreted by electronic circuitry as activation of a simple momentary-On only On/Off switch, such activation serving to indicate, for example, that moving back to a previously viewed screen is desired, or in other words serving as a "BACK" button or as a FORWARD button as used in Internet and the like network on-line navigating software. The same finger depressible button with the same analog sensor may be used in the second role by continuously holding down the button beyond a brief given amount of time which can be interpreted as an analog input, and used for example, to cause scrolling of the shown screen or window at a representative scroll speed according to the depressive pressure. When the analog sensors are applied as dual role sensors in a mouse in accordance with the present invention for computer control, the current invention offers advantages in manipulating the computer particularly when navigating the Internet or like on-line networks. With a review of this disclosure, those skilled in the art will recognize the dual role use of analog sensors on a mouse can be applied to functions other than or in addition to Back and Forward address buttons and scrolling control.

Additionally disclosed is an improved method of scrolling using a desktop mouse type controller with finger depressible buttons, and also methods of manufacturing an improved mouse type controller in accordance with the present invention.

While the present improved desktop mouse can be structured in numerous embodiments, one or more embodiments can be achieved with few and inexpensive changes in prior art technology in order to achieve the many benefits of the present invention. For example, prior art elastomeric dome-cap type sensors have been always used as simple momentary-On only On/Off switches or bounceless On/Off switches in associated circuitry structured to use the sensor only as such a switch, i.e., having only two readable states, On and Off. Such elastomeric injection molded dome-cap sensors are in the prior art employed as switches in some computer mice and for scrolling control, allowing the user to activate scrolling at a predetermined rate by depressing the button atop the dome-cap sensor to achieve the singular On state. While the elastomeric injection molded dome-cap sensor is not the only suitable sensor for use in a desktop mouse in accordance with the present invention as will be demonstrated, I have discovered that the active element or conductive pill of such prior art elastomeric dome-cap sensors is compression or pressure-sensitive and variably conductive to a useful degree, and is thus pressure-sensitive variable-conductance material, although not the optimum material. As will be herein detailed, the active element of typical dome-cap sensors in terms of the pressure-sensitive variable-conductance aspect thereof can be improved upon, as discussed later herein. This pressure-sensitive property of the active element of the dome-cap sensor can be used as an analog or variable pressure sensor. With applied varying pressure changes, the active element changes it's conductivity, i.e., resistivity, relative to the applied pressure or degree of compression of the active element. The active element, while a moderate to poor conductor when not under compressive force, drops in resistivity when placed under compressive force, such drop in resistivity being related to the amount of compression of the active element. This pressure-sensitive variable-conductance aspect of the active element in the elastomeric injection molded one-piece dome-cap opens many new and valuable possibilities of use, such as in the depressible buttons on a desktop computer mouse.

Such new possibilities include very low cost pressure-sensitive variable-conductance sensors useful in a computer desktop mouse as user determinable pressure-sensitive variable scroll control depressible buttons. In the past, variable-conductance sensors incorporated into consumer electronic devices were expensive potentiometers and sliding plate resistors, or pressure-sensitive sensors which have typically been even more expensive, running from a few dollars and upward per sensor, and thus such pressure-sensitive sensors are sparingly used. Pressure sensitive variable-conductance sensors are not known to have been used as analog depressible buttons or sensors on desktop computer mice. On the other hand, the very low-cost elastomeric dome-cap sensors are currently manufactured in very high volume and ubiquitously used as simple only On/Off switches in the large body of currently existing consumer electronics including computer mice.

As previously stated, while the elastomeric injection molded dome-cap sensor is not the only suitable sensor for use in a desktop mouse in accordance with the present invention, the elastomeric dome-cap sensor provides an extremely low cost, durable member capable of serving multiple functions, all of which can be advantageous and beneficial for a pressure-sensitive variable-conductance sensor in a computer control desktop mouse as taught herein. Such multiple functions of the elastomeric one-piece injection molded dome-cap can include: the dome-cap serving as an inexpensive return spring for ensuring termination of pressure on the active element; the top exterior of the dome-cap can provide an exposed finger engagement surface when properly fashioned for serving as a finger surface on which a user can press absent a requirement of additional button caps or triggers atop the dome-cap; a seal or debris excluder over electric component surfaces such as the active element and adjacent circuit elements which could be adversely affected by the entrance of foreign matter; tactile feedback to the user upon actuation and de-actuation of the active element or sensor; an ergonomically correct depressible surface which is variably depressible through a wide range, generally absent an uncomfortable non-ergonomic hard-stop at the bottom of the depressive stroke; and the injection molded dome-cap providing these functions can be mounted on various base materials such as flexible membrane circuit sheets, rigid circuit boards and flexible membranes supported or stiffened by rigid boards which can themselves possess circuitry.

Additionally, the injection molded dome-cap can be manufactured with multiple dome-caps in a single injection molded sheet wherein all of the dome-caps can be utilized as novel pressure sensors or some of the dome-caps can be novel pressure sensors mixed with other dome-caps used as traditional momentary-On only On/Off switches. Such multiple dome-cap sheets can be highly useful and cost effective in a desktop mouse type device for pointing and for controlling certain functions of computers, wherein some functions may be best served with momentary-On switches (e.g. conventional right and left selection buttons) while other functions (e.g. screen scrolling) can be best served with variable-conductance pressure sensors, using the teachings herein.

Another benefit of the invention taught herein is the ease of changeover by manufactures who currently make desktop mice for computer control which include housings with circuit boards therein, elastomeric dome-cap sensors associated with the circuit boards and used for scrolling control, the housings structured to allow access to the dome-caps to allow depression thereof, and rotatable balls in-part exposed for rotation relative to the housing for pointer-control. Following the herein teachings, in the most minimal case to structure a desktop mouse in accordance with the invention, such manufacturers will only need to apply new or modified circuitry on the circuit boards capable of reading any one of at least three readable states (electric states or values) or many more representing depression of the dome-cap sensor associated with window or screen scrolling. The at least three states of the dome-cap and active element (analog sensor) can represent at least: 1) no pressure, 2) low pressure, and 3) high pressure applied to the scrolling dome-cap sensor or sensors and thus the active element of the dome-cap. The dome-cap analog sensor and circuitry arrangement as herein taught can be employed in a manner wherein not just three but many states are read, thus ensuring high resolution reading of a variably changing depressive button pressure input.

Yet another benefit of the teachings herein is that not only can a typical prior art dome-cap style switch be used as a pressure-sensitive variable-conductance sensor in a computer desktop mouse, but if desired, such a sensor can also supply the user with a tactile feedback on actuation of the sensor, and even further upon deactivation of the sensor. Benefits of the tactile feedback include a reduction of potential confusion on the part of the user as to when the sensor is initially actuated and de-actuated.

These, and many other objects and advantages of the present invention will become increasingly appreciated with continued reading and with a review of the drawings.

BRIEF DESCRIPTION OF THE DRAWINGS

FIGS. 22–25 show cross section views of depressible rocker buttons with sensors in a desktop computer mouse housing.

BEST MODES FOR CARRYING OUT THE INVENTION

Figure 1:
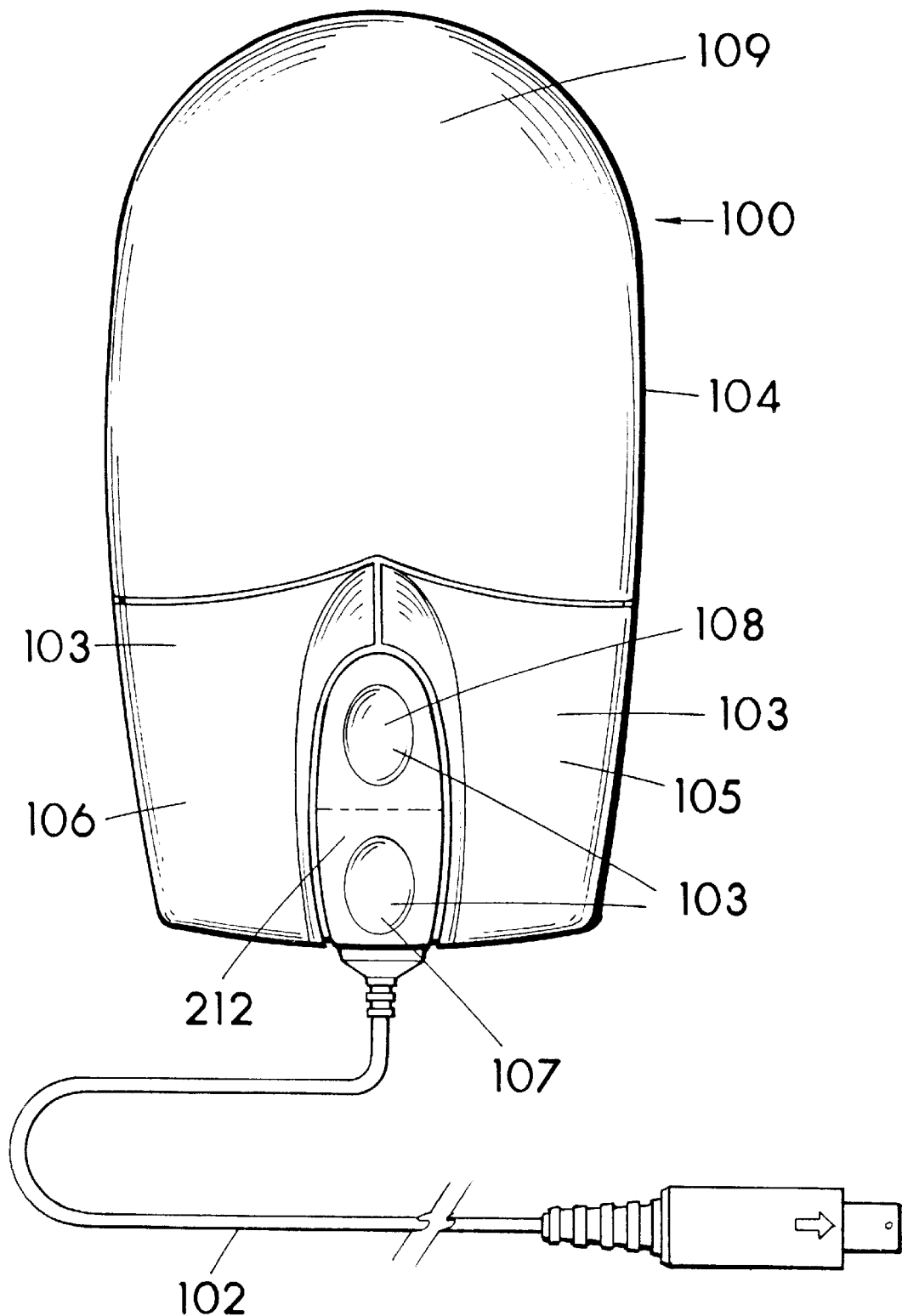
FIG. 1 is a top plan view of a computer desktop mouse with a plurality of exposed finger depressible buttons on a top of the housing and forward of a hand palm rest area.
Figure 2:
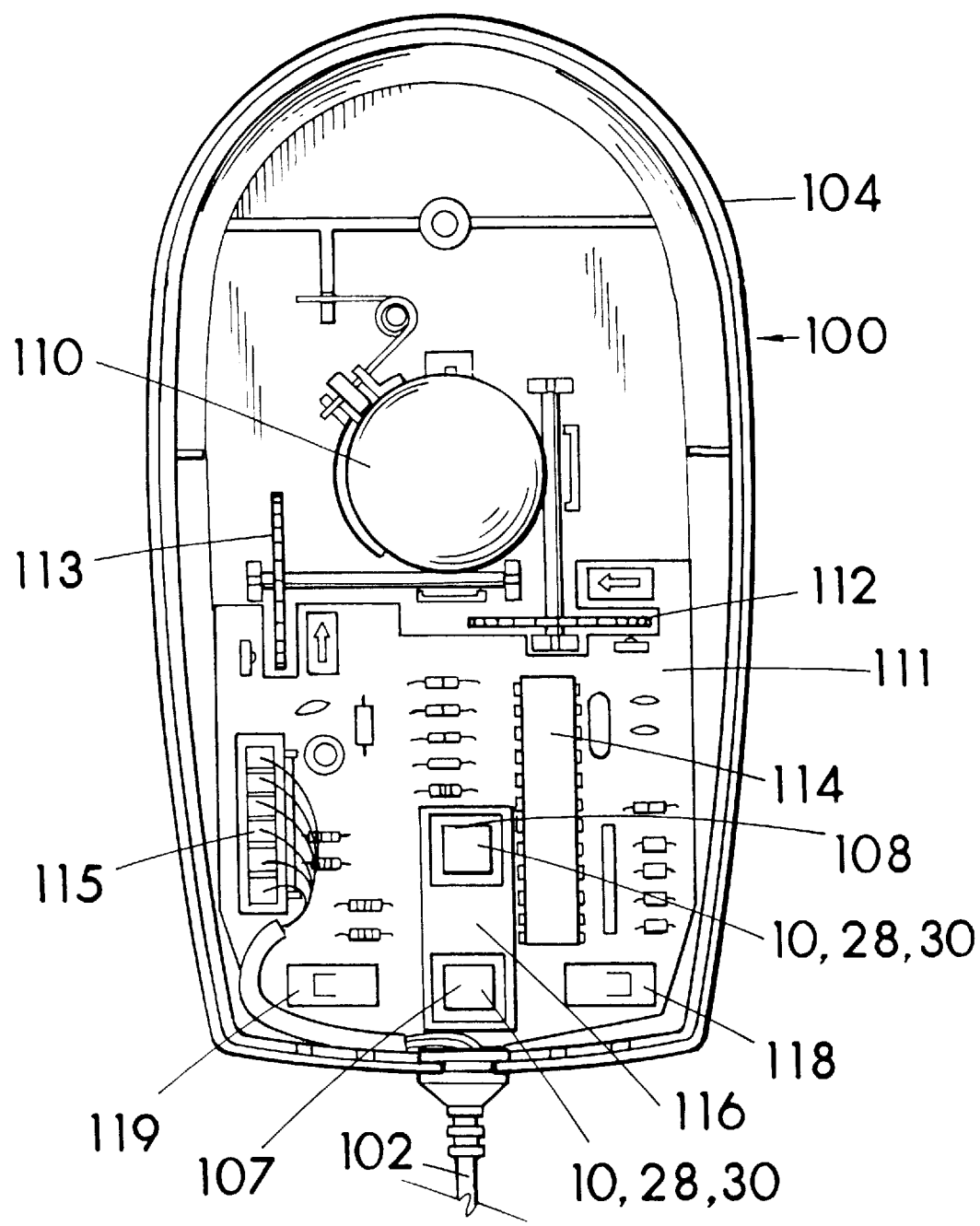
FIG. 2 is a drawing of the FIG. 1 desktop mouse with a top half or portion of the housing removed or not yet assembled to show a rotatable pointer control ball, a circuit board and sensors and switches.

In elaboration of the hereinabove details of the Invention and with specific reference to the included drawings, best modes for carrying out the invention will now be further described. FIG. 1 is a top plan view of a desktop computer operated control device, i.e., desktop mouse 100 with a plurality of finger depressible surfaces or buttons 103 on a single depressible plate 212 exposed on a top of the housing 104 top portion, and including a rotatable pointer control ball 110 (FIG. 2). Desktop mouse 100 physically appears as some prior art desktop mice, yet is in accordance with the present invention, although the improved desktop mouse as taught herein can be shaped into different appearances including different button 103 layouts. Desktop mouse 100, with the exception of the electronic circuitry particulary for reading scroll buttons 107 and 108, is conventionally structured much like some prior art desktop mice of the type having rotatable pointer control balls, right and left select buttons, and scroll-up and scroll-down finger depressible buttons. Another possible difference in mouse 100 from such prior art desktop mice is that the active element of the dome-cap sensors associated with scroll buttons 107 and 108 in the present invention may be formed of an improved pressure-sensitive variable-conductance material, i.e., having improved variable-conductance characteristics compared to the standard dome-cap active element which does have usable pressure-sensitive variable-conductance characteristics.

Figure 3:
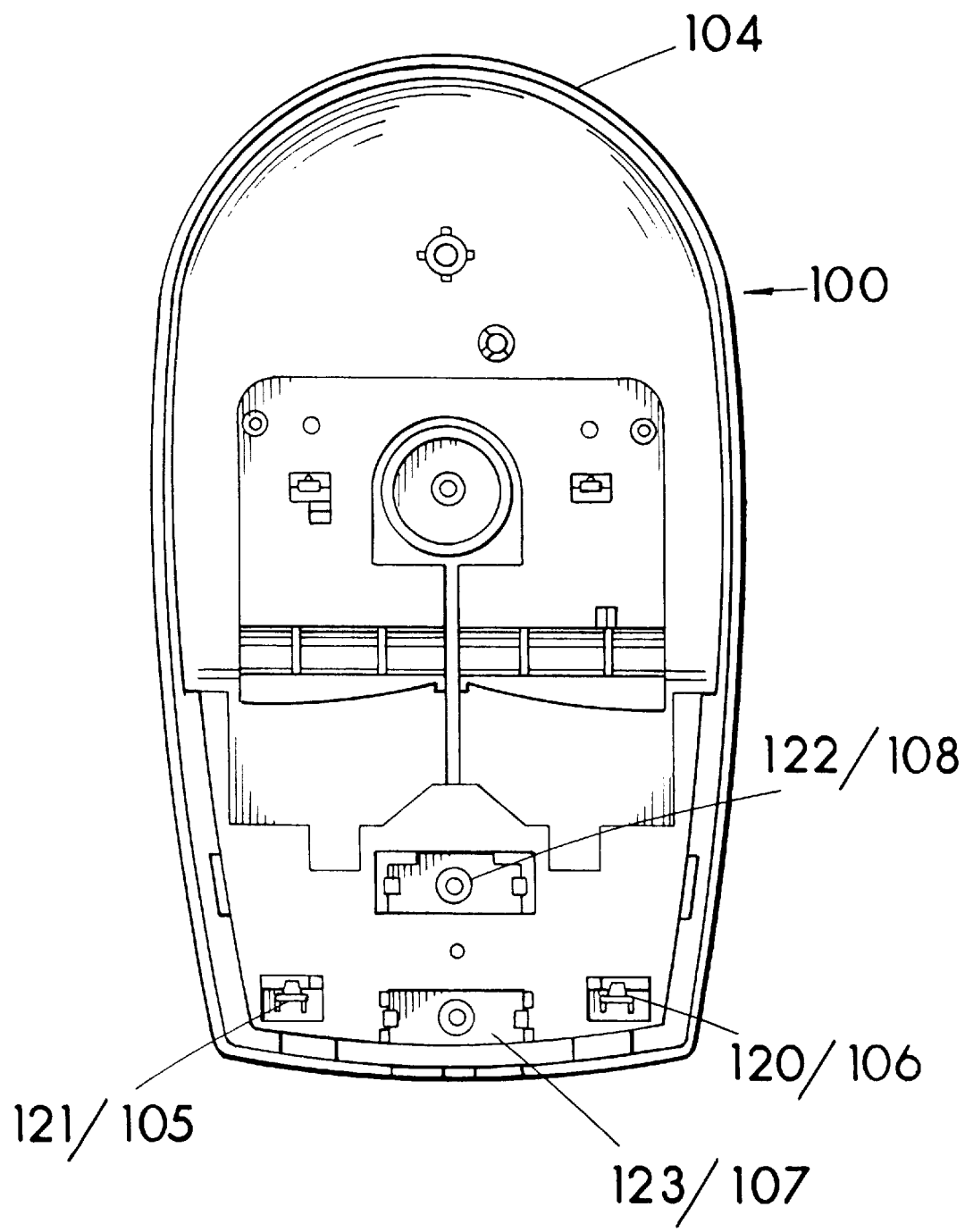
FIG. 3 is a drawing of the inside or underside of the housing top of the mouse of FIG. 1.

In further reference to desktop mouse 100 of FIGS. 1–3, housing 104 contains or houses electronic circuitry such as on a circuit board 111 (FIG. 2) for interfacing with electrical sensors associated with the depressible buttons 103, for detecting ball 110 movement and for communicating information related to activation thereof to a computer. As will be detailed, in most cases some of the buttons 103 are associated with momentary-On only On/Off switches which the circuitry reads only as such, i.e., On or Off, having only two readable states, while others of the buttons 103 are, in accordance with the invention, associated with pressure-sensitive variable-conductance sensors (analog sensors) which the circuitry reads as having at least three readable states, e.g., Off, first On state and second On state. Preferably, there are not just three states, but a continuum of many different values of On states associated with the pressure-sensitive variable-conductance sensors (analog sensors). Desktop mouse 100 is also shown with a multi-conductor cable 102 connected thereto, cable 102 having a cord end as is common with desktop mice which plug into a port on a computer. Cable 102 would not be present on a desktop mouse in accordance with the invention which communicated with a computer through wireless communication such as infrared light for example only, and which contained a battery to provide electrical power to the circuitry of circuit board 111. Cable 102 is shown in FIG. 2 connecting at 115 to circuit board 111, and as is known by those skilled in the art, electrical power is brought into the circuitry of board 111 from the host computer, and information (control signals) from the mouse is sent or communicated from the electronic circuitry of board 111 to the computer through the conductors of cable 102. Wireless desktop mice use batteries in housing 104 for electrical power to the electronics of the mouse (circuit board 111). Also shown in FIG. 1 is a button 105 which is a left side select button which is probably best served by a normally-open momentary-On switch 118 (see FIG. 2) read as only having two readable states, and button 106 being right side select button which is probably best served by a normally-open momentary-On switch 119 (see FIG. 2) read as only having two readable states by the electronic circuitry of the mouse. Further shown in FIG. 1 is button 107 which in this example is a scroll-up button associated with an elastomeric dome-cap sensor 10, 28 or 30 (see FIG. 2) structured as and used as an analog sensor as will be detailed later in this disclosure. Also shown in FIG. 1 is button 108 which in this example is a scroll-down button associated with an elastomeric dome-cap sensor 10, 28 or 30 (see FIG. 2) structured as and used as an analog sensor as will be detailed later in this disclosure. The scroll up and scroll down button assignments may be reversed if so desired by the user within the mouse driver software settings. The elastomeric dome-cap sensors associated with finger depressible buttons 107 and 108 are shown in FIG. 2 as connected by a sheet, i.e., the dome-caps are integrally molded to a connecting sheet. A palm rest area 109 is also shown in FIG. 1 on the top outer surface of housing 104 and rearward of buttons 107 and 108.

FIG. 2 is a drawing of the FIG. 1 desktop mouse 100 with the top of the housing 104 removed to show the pointer control rotatable ball 110 arranged in a conventional mouse ball arrangement to be read by a first encoder 112 and a second encoder 113 or the like for reading movement of the ball 110 relative to housing 104 along X and Y axes and used for cursor control and pointing. Rotatable ball 110, the mounting and movement reading arrangement therefore may or can be of a conventional type in a desktop mouse in accordance with the invention. Further shown is circuit board 111 which includes electronic circuitry thereon, typically most of the electronic circuitry will be primarily in a microcontroller 114 or ASIC chip 114 (application specific integrated circuit) or a COB package (chip on board) or the like.

FIG. 3 is a drawing of the inside or underside of housing 104 top of desktop mouse 100 of FIG. 1 and showing moveable surfaces 120, 121, 122, 123 which in this example are surfaces which are connected to or the actual bottom sides of the exposed button surfaces 103 depressible by fingers and which move with button depression to impinge directly on the depressible button of associated electrical switch or sensor associated with the exposed finger depressible button. Specifically, surface 120 moves down with depression of button 106 to impinge upon and depress the button of right select switch 119 and thus activate the switch; surface 121 moves down with depression of button 105 to impinge upon and depress the button of left select switch 118 and thus activate that switch; surface 122 moves down with depression of button 108 to impinge upon and depress the depressible portion or button (dome-cap) of scroll-down dome-cap sensor 10, 28 or 30 depending on which sensor is used and thus to activate the analog sensor; and surface 123 moves down with depression of button 107 to impinge upon and depress the depressible portion or button (dome-cap) of scroll-up dome-cap sensor 10, 28 or 30. Varying amounts of pressure can be applied to any of the switches and sensors by the user simply applying varying amounts of pressure to the associated button 103 or button area with his or her finger. The depressible button 103 of the individually identified buttons 107 and 108 of FIG. 1 and 3 of mouse 100 is a rocker style depressible button arrangement having a center pivot (pivot not shown but approximately beneath the broken line in FIG. 1) in this example, allowing only one of the associated sensors to be depressed at any given time, and thus the rocker button can be viewed as two separate buttons 103, however buttons 107 and 108 could be completely separate in terms of button surfaces 103 as indicated by a broken line in FIG. 1, and the dome-cap sensors associated therewith need not be connected in sheet form as shown in FIG. 2. Also, the electrical elastomeric dome-cap sensors 10, 28 or 30 used with buttons 107 and 108 in mouse 100 could be replaced with a package sensor 39, an analog sensor which will be detailed later in this disclosure. It should be noted, that the top exterior of an elastomeric dome-cap can provide an exposed finger engagement surface or button 103 on which a user can press absent a requirement of additional button caps or mechanical rockers atop the dome-cap, and typically the top of the dome-cap in this use would protrude through a hole in the housing to allow the user to place a finger directly thereagainst. Furthermore, buttons 107 and 108 forming a rocker can be structured without a center pivot and thus depression of the entire rocker stimulates opposing sensors 107 and 108 thus indicating a different functionality such as for example depression of a third or central selection button.

Figure 4:
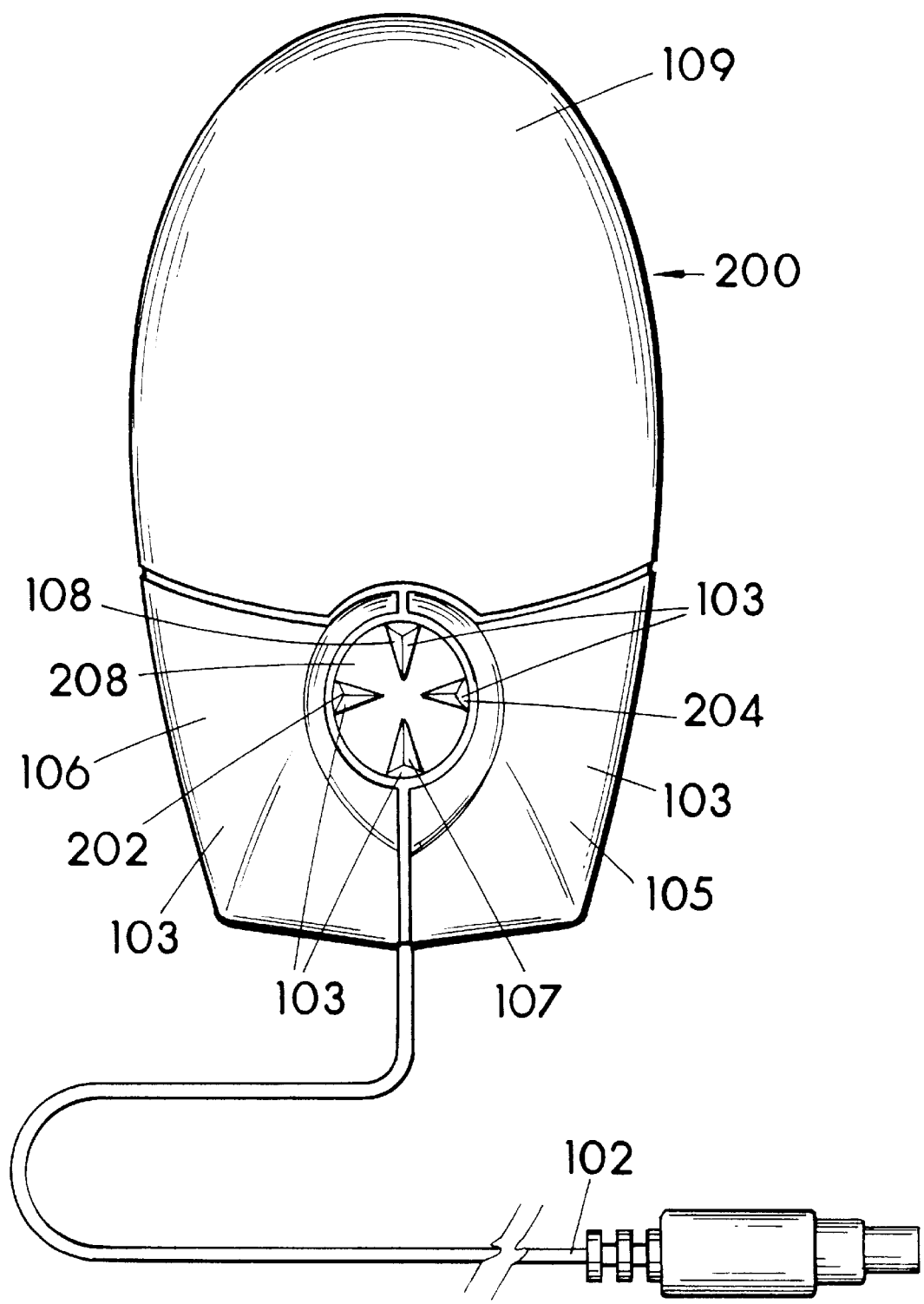
FIG. 4 is a top plan view of another embodiment of computer desktop mouse with a plurality of exposed finger depressible buttons on a top of the housing top portion and positioned forward of a hand palm rest area.
Figure 5:
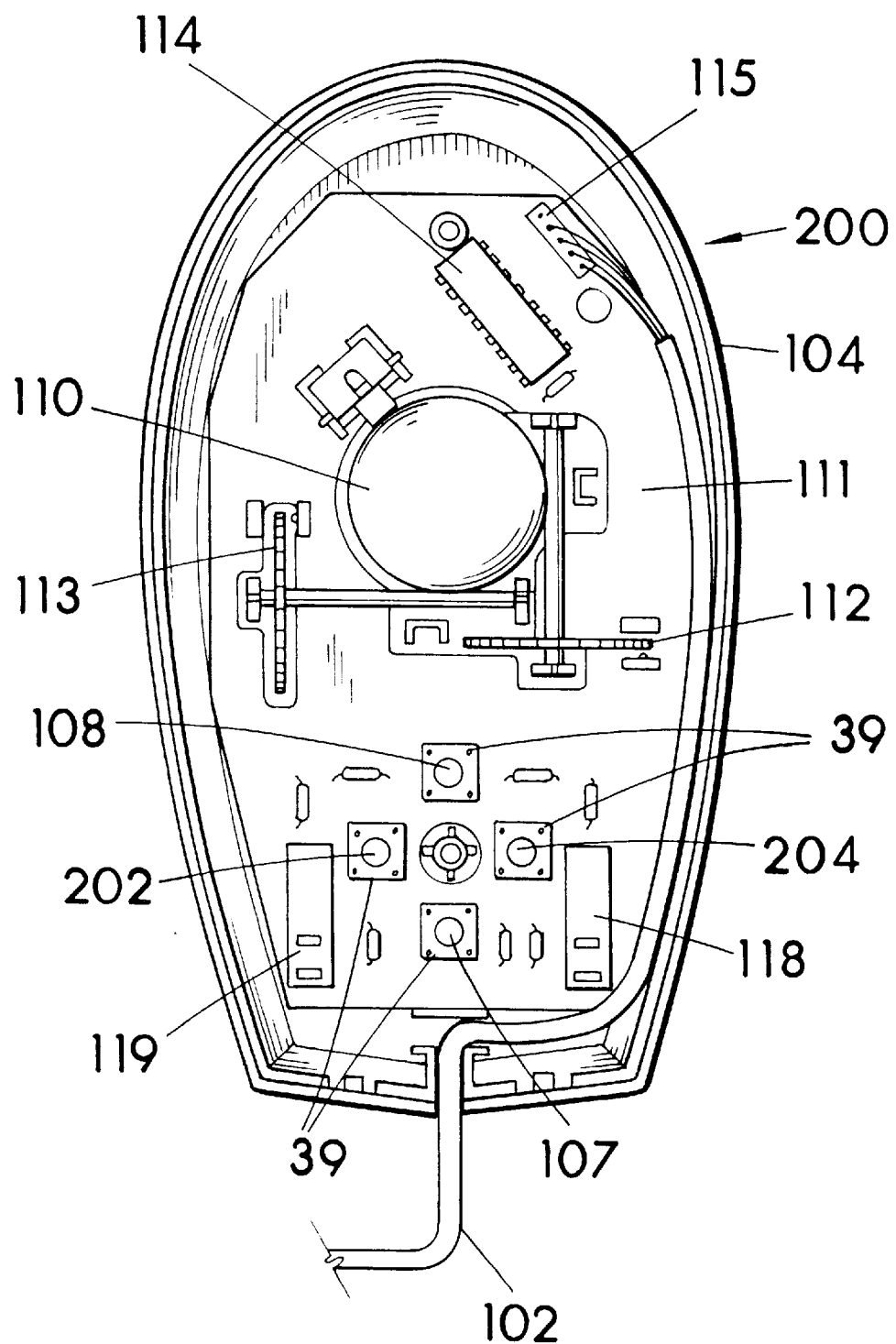
FIG. 5 is a drawing of the FIG. 4 mouse with the top of the housing removed or not yet assembled to show a rotatable pointer control ball, a circuit board and sensors and switches.

FIG. 4 is a top plan view of a desktop mouse 200 having a plurality of finger depressible buttons 103 exposed on the top of the case or housing 104, and including a rotatable pointer control ball 110 (FIG. 5). Desktop mouse 200 physically appears as some prior art mice yet is in accordance with the present invention, although the improved desktop mouse as taught herein can be shaped to appear substantially different and can include different depressible button layouts. Like parts serving like functions in mouse 100 and mouse 200 have like numbers applied thereto. Desktop mouse 200, with the exception of the electronic circuitry particulary for reading scroll buttons 107, 108, 202 and 204 is conventionally structured much like some prior art desktop mice of the type having rotatable pointer control balls, right and left select buttons, scroll-up and scroll-down finger depressible buttons, and further including scroll-right and scroll-left depressible buttons. Another difference in mouse 200 from such prior art desktop mice is that while such prior art desktop mice include package switches or sensors appearing as those shown in FIG. 5, prior art package sensors do not include pressure-sensitive variable-conductance material for providing at least three readable states. Mouse 200 is shown in FIG. 5 having four novel package sensors 39, as will be detailed, package sensors 39 each include pressure-sensitive variable-conductance material for providing at least three readable states. Preferably, there are not just three states, but a continuum of many different values of On states associated with the pressure-sensitive variable-conductance sensors (analog sensors). In further reference to desktop mouse 200 of FIGS. 4–6, mouse 200, like that of mouse 100, contains electronic circuitry inside housing 104 such as on a circuit board 111 (FIG. 5) for interfacing with electrical sensors associated with the depressible buttons 103. In most cases some of the buttons 103 are associated with momentary-On only On/Off switches which the circuitry reads only as such, i.e., On or Off, or as having only two readable states, while others of the buttons 103 such as scroll control buttons 107, 108, 202 and 204 are associated with pressure-sensitive variable-conductance sensors (analog sensors) such as in FIGS. 7, 9, 11, 12 or 13–15 (to be described below) which the electronic circuitry reads as having at least three readable states, e.g., Off, a first On state and a second On state which can be On low and On high for example. Other assignments can be made for the three readable states, as well as many On states between On low and On high which the human user can control through varied or different amounts of depressive pressure applied to the button associated with such analog sensors. Normally only one depressible button is or will be associated with only one analog sensor. Mouse 200 differs from mouse 100 in that mouse 200 further includes an optional scroll-right button 202 and a scroll-left button 204, although the scroll-right and scroll-left buttons could be added to mouse 100. Mouse 200 includes a four-way rocker plate 208 in effect providing four depressible button surfaces 103 or areas for depressing with a finger, but allowing independent sensor actuation or for two adjacent sensors to be simultaneously actuated, such as for example only, scrolling up and to the right at the same time. The four associated sensors could each be associated with only one completely separate button surface 103 if desired.

FIG. 5 is a drawing of the FIG. 4 mouse 200 with the top of the housing 104 removed to show pointer control rotatable ball 110 arranged in a conventional desktop mouse ball arrangement to be read by a first encoder 112 and a second encoder 113 or the like for reading movement of the ball 110 relative to housing 104 along X and Y axes and used for cursor or pointer control. Rotatable ball 110, the mounting and movement reading arrangement therefore may or can be of a conventional type in a desktop mouse in accordance with the invention. Also shown in FIG. 5 is a circuit board 111 having electronic circuitry thereon, and switches or sensors 118 and 119. In this example, sensor 118 is a momentary-On switch read by the circuitry of circuit board 111 as having only two readable states, i.e., On and Off, the switch being the left select switch associated with button 105 and impingement point 121 of FIG. 6. Sensor 119 is a momentary-On switch read by the circuitry as having only two readable states, i.e., On and Off, the switch being the right select switch associated with button 106 and impingement point 120 of FIG. 6. Also shown in FIG. 5 are four packaged sensors 39 each in accordance with a novel structure of packaged analog sensor 39 to be detailed below. One sensor 39 is the sensor associated with the 107 button for initiating scroll-up, another sensor 39 is the sensor associated with the 108 scroll-down button, another sensor 39 is associated with button 202 to be initiated thereby, and the fourth sensor 39 is associated with button 204 to be initiated thereby when the human user depresses the button. The sensors 39 are electrically connected to the circuitry or electronic circuits of circuit board 111.

Figure 6:
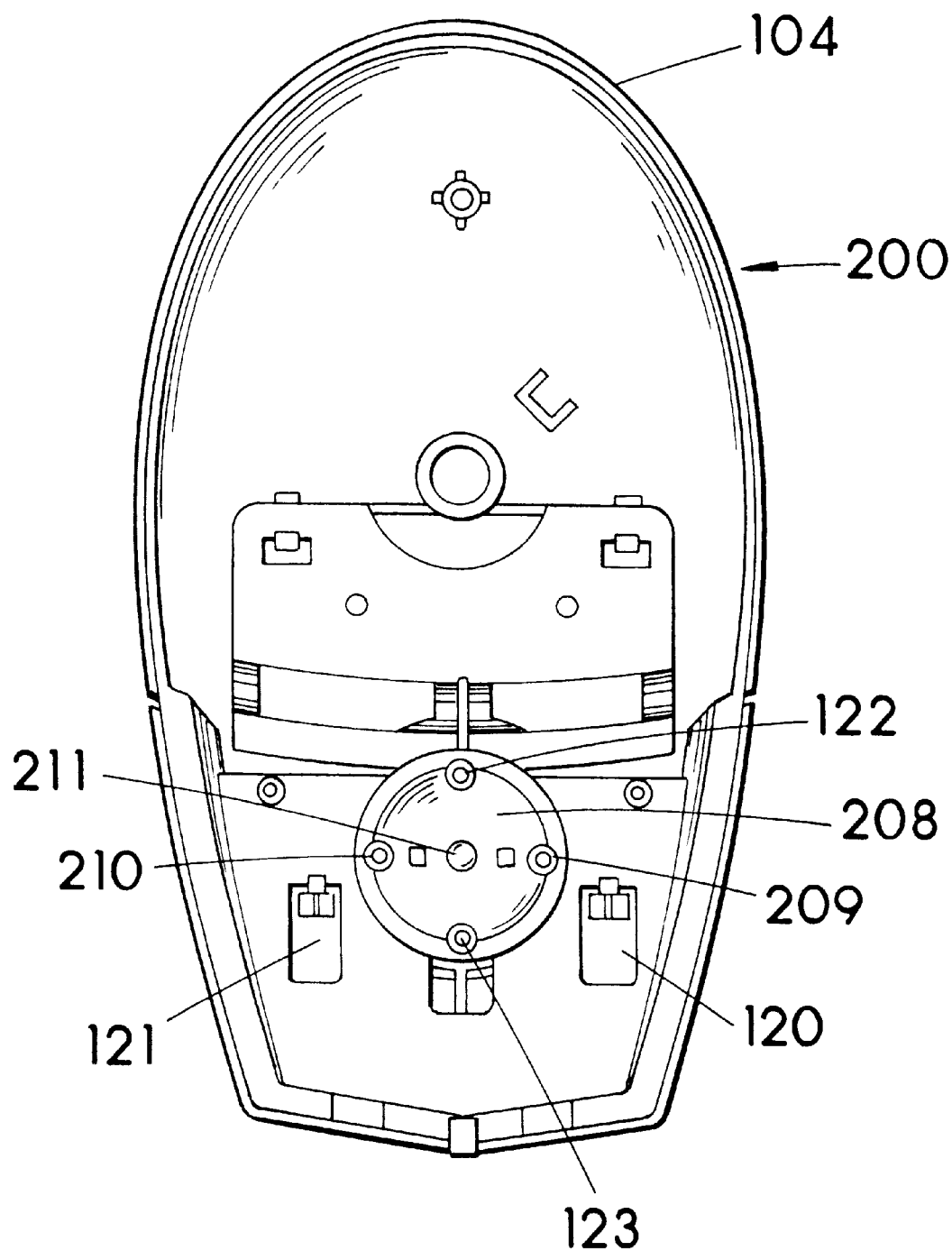
FIG. 6 is a drawing of the inside or underside of the housing top of the mouse of FIG. 4.

FIG. 6 is a drawing of the inside or underside of the housing top of the mouse of FIG. 4. Shown are moveable surfaces 120, 121, 122, 123, and additionally moveable or impingement surfaces 209 and 210 which in this example are surfaces which are connected to the undersides of exposed button surfaces 103 depressible by fingers and which move with button depression to impinge directly on the sensor activating button of the associated electrical switch or sensor associated with the button 103. Specifically, surface 120 impinges on switch 119; surface 121 impinges on switch 118; 122 impinges upon and depresses button-like actuator 44 (FIG. 13) on the package sensor 39 associated with scroll-down button 108; 123 impinges upon and depresses button 44 on the package sensor 39 associated with scroll-up button 107; 209 impinges upon and depresses button 44 on the package sensor 39 associated with button 202 for scroll-right; and 210 impinges upon and depresses button 44 on the package sensor 39 associated with button 204 for scroll-left. The four impingement surfaces 122, 123, 209 and 210 in FIG. 6 are all, in the shown example, on a single four-way rocker plate 208 having an optional center pivot point 211 which allows the impingement points to contact one at a time, or possibly two adjacent sensors 39 at a time. Rocker plates for activating sensors are well understood by those skilled in the art. It should be noted sensors 39 in mouse 200 could be replaced with dome-cap analog sensors such as sensor 10, 28 or 30 to be described below. Plate 208 is a lower portion of the shown plate 208 of FIG. 4 and is movably retained to housing 104. Four completely individual depressible buttons 103 could be used instead of the depressible rocker plate 208 arrangement, however because rocker plate allows, by its rocker action, single electrical sensor actuation, the four finger depressible areas can be considered four finger depressible buttons 103. Plate 208 can be structured without a center pivot 211 and thus depression of the entire button 208 stimulates opposing sensors 202 and 204, or 107 and 108 thus indicating a different functionality such as for example depression of a third or central selection button.

Figure 7:
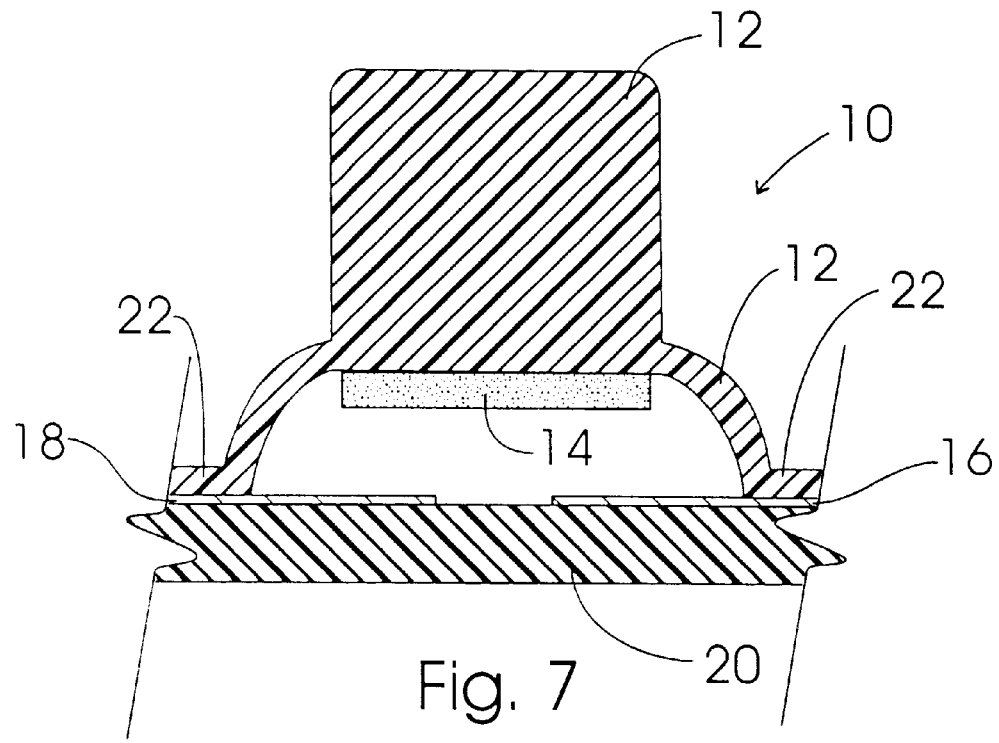
FIG. 7 shows a median cross section view of an elastomeric injection molded one-piece dome-cap sensor as could be used in a desktop mouse in accordance with the invention. The sensor is shown with the active element attached to the underside or bottom of the raised dome-cap and thus the active element is carried by and within the dome-cap.

FIG. 7 shows a median cross section view of an elastomeric dome-cap sensor 10 as can be used in a desktop mouse in accordance with the invention. Elastomeric dome-cap sensor 10 is an electrical sensor using an elastomeric injection molded one-piece dome-cap 12 as a component thereof. Dome-cap sensor 10 is in accordance with the prior art and can be used in a novel new use of such a sensor in a desktop mouse as a pressure sensitive analog scroll control, and in a novel new structural combination as herein disclosed in accordance with the present invention. Dome-cap sensor 10 may include an improved pressure-sensitive variable-conductance material active element 14 such as by utilizing material 54 to be described below. Sensor 10 is shown in the deactivated state or condition with the elastomeric one-piece injection molded dome-cap 12 raised and thus the active element 14, i.e., conductive pill is shown raised and disengaged from two proximal conductive elements 16, 18. The sensor 10 is in a "state" which is readable by circuitry and which could or can be considered an Off state or first state of at least three readable states. In a desktop mouse in accordance with the present invention, the two proximal conductive elements 16 and 18 are or would be conductive elements of the circuitry on circuit board 111 or the like circuit bearing member. The active element 14 is attached to the underside of dome-cap 12 and is thus carried by the dome-cap, the attaching most commonly being by the dome-cap 12 being formed by injection molding to the pre-formed active element 14 which has been inserted into the molding cavity prior to the injecting of the thermoset rubber commonly used to make highly durable dome-caps 12. Multiple shot injection or adhesive attachment or any other suitable connection can be used to connect active element 14 to injection molded dome-cap 12. Conductive elements 16, 18 are shown attached to or supported by a typically non-conductive base 20 which is a board of a circuit board such as circuit board 111, a flexible membrane sheet, combination thereof or the like. Dome-cap 12 is shown with an outward extending flange 22 at it's bottom end on base 20 extending parallel to base 20. Flange 22 is typically integrally injection molded or in one-piece with the balance of dome-cap 12. Flange 22 can be adhered in place to base 20 such as with adhesives or dome-cap 12 can be otherwise held in proper location to base 20 and conductive elements 16, 18 such as with mechanical restraints, as for example by sandwiching flange 22 between portions of a housing or the like, or by having the upper portion of dome-cap 12 positioned within a movement restricting opening in a housing which only allows the upper portion to move toward and away from base 20 and conductive elements 16, 18. Flange 22 can be a portion of the sheet 16 connecting multiple dome-caps 12. The FIG. 7 sensor, but with the active element containing tungsten carbide (such as material 54 to be detailed) is a highly preferred sensor embodiment for use with or in conjunction with the present invention.

Figure 8:
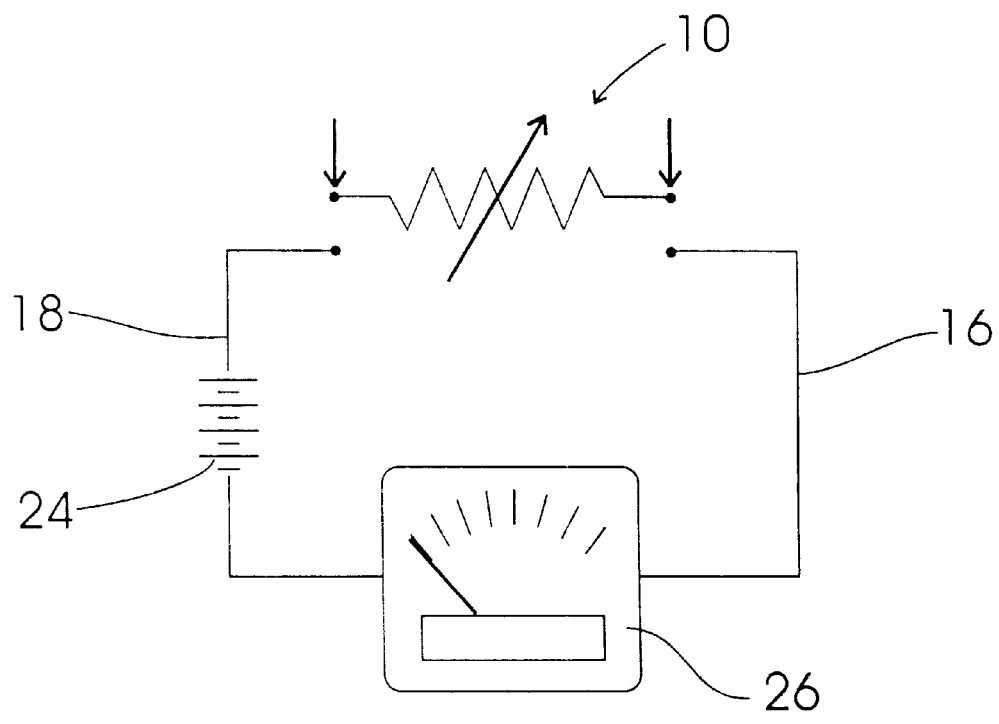
FIG. 8 shows, for demonstration purposes, a simple electrical circuit arranged to be an analog sensing circuit and utilizing the elastomeric dome-cap sensor of FIG. 7 as a pressure-sensitive variable-conductance sensor.

FIG. 8 shows a simple electrical circuit structured to be an analog sensing circuit and utilizing the elastomeric dome-cap sensor 10 of FIG. 7 as a pressure-sensitive variable-conductance sensor. "Analog sensing circuit" is one which is structured to be at least in part manipulated or controlled by operation of an analog sensor, the analog sensor being a sensor capable of being read by electronic circuitry including analog sensing circuitry as having at least three readable states dependant upon applied depressive pressure. No applied depressive pressure can be and will normally be treated as an amount of depressive pressure and associated with one of the three readable states. Also specifically shown is a battery 24 as an example of an electrical power source in the circuit, cord 102 would bring in electrical powered in a cord connected desktop mouse. Also shown is a meter 26 including an electromagnetic coil engaged to a moveable indicating needle adjacent a printed scale or range gauge and capable of showing varying conductivity across the elastomeric dome-cap sensor 10. The dome-cap sensor 10 is indicated in the circuit as being in what could be considered a first or open state in this example. It should be understood that depressive pressure applied to the dome-cap 12 will move the raised portion of the dome-cap 12 toward base 20 sufficiently to bring the active element 14 into contact with both conductive elements 16, 18, and with sufficient pressure, and varying pressure well within a range readily applied by a human finger, the sensor 10 will be moved to second and third, etc. states with increasing applied pressure, and the different states in this example, because this is an analog circuit, will be indicated by the needle of the meter 26 being positioned left, right or at various states in between on the scale. The scale of meter 26 in this example includes marks which the needle moves through, in this example the needle moving to the right as the resistivity of the active element 14 decreases. It can be appreciated that while the marks are only printed on the scale, each mark represents a position the needle can pass through, and an electrical state of the sensor in which each can have a digital bit assignment associated therewith. In this example, higher pressure to dome-cap 12 and active element 14 would move the needle further to the right indicating lower resistivity, i.e. greater conductivity of active element 14. As can be appreciated and as will be further discussed below, digital bit assignments can be made for any level or state of conductivity and at least two bits of digital information are required for identifying more than two readable states. Such digital information can readily be used as control signals such as scroll control signal communicated from the desktop mouse to a computer. It should be understood that meter 26 is only for illustrative purposes, as such a meter with needle is not anticipated as being required in a mouse in accordance with the invention.

Figure 9:
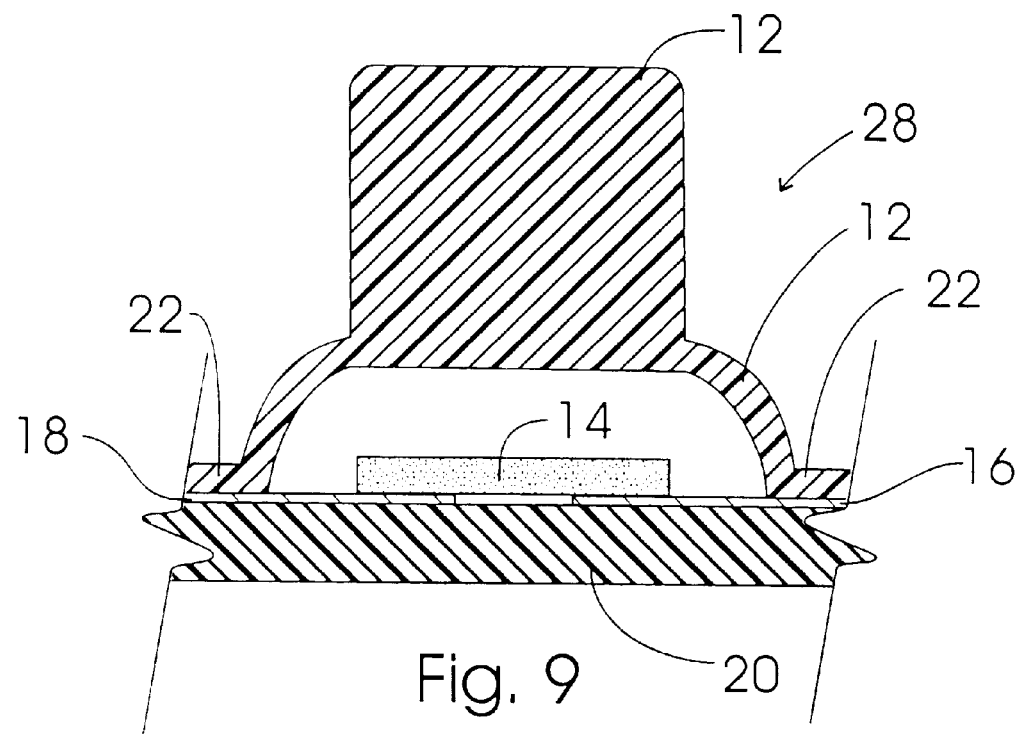
FIG. 9 shows a median cross section view of another embodiment of elastomeric injection molded one-piece dome-cap sensor as could be used in a desktop mouse in accordance with the invention. The shown sensor is a structural arrangement wherein the active element is shown atop and spanning across two proximal conductive elements and within the confines of the injection molded dome-cap but not carried by the dome-cap. The elastomeric injection molded dome-cap is shown in a raised position above the active element.

FIG. 9 shows a median cross section view of an elastomeric dome-cap sensor 28 structured with the active element 14, mounted or freely resting atop and spanning across the two proximal conductive elements 16, 18. The dome-cap 12 is shown in a raised position above the active element 14 (or 54) and the sensor is shown in what can be used as or considered as a deactivated state or first state (off or open state) since no compressive pressure or force is being applied to active element 14. The conductive pill or active element 14 of a typical prior art dome-cap sensor is a moderate to poor conductor when not compressed and becomes a much improved conductor under compression, and this means that if active element 14 of the FIG. 9 sensor is made of the same material commonly used as the active element in prior art dome-cap sensors, then when the dome-cap is raised as shown in FIG. 9, minimal current (little if any current depending upon the applied voltage) can flow between the two proximal conductive elements 16, 18. Such minimal current flow is to a lessor extent than if the active element were under compression, and so this lessor extent, if desired, can be treated as and/or assigned a bit assignment representing a deactivated state with the activated states being associated with the varying conductivity of the active element 14 when under varying degrees of compression. Active element 14 is shown in FIG. 9 trapped within the dome-cap but not carried by the dome-cap 12.

Figure 10:
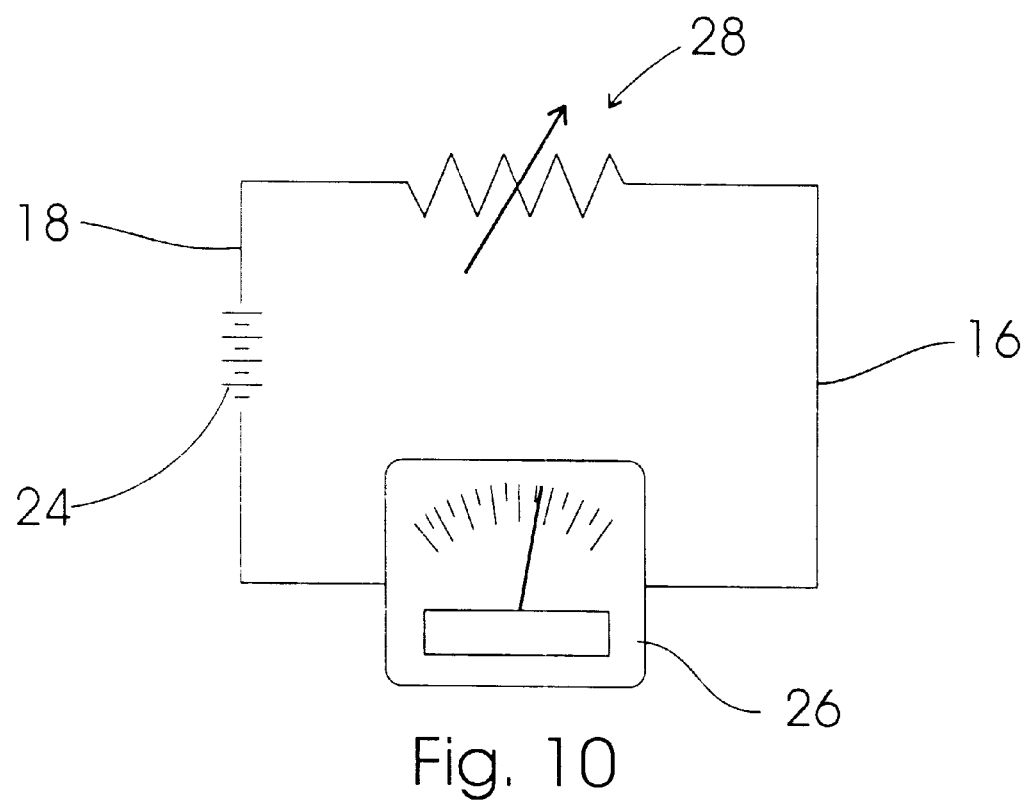
FIG. 10 shows, for demonstration purposes, a simple electrical circuit arranged to be an analog sensing circuit and utilizing the elastomeric dome-cap sensor of FIG. 9 as a variable-conductance sensor.
Figure 11:
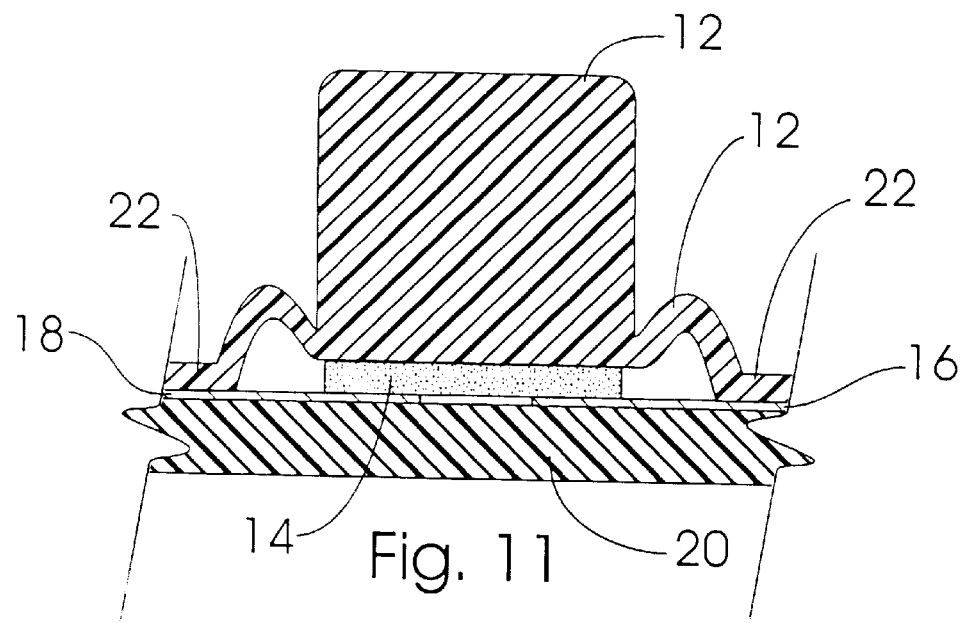
FIG. 11 shows a median cross section view of an elastomeric dome-cap sensor with the dome-cap depressed and representing the dome-cap sensors of either FIG. 7 or FIG. 9 in a state wherein compression or force of some level or amount is applied to the active element.

FIG. 10 shows a simple electrical circuit arranged to be an analog sensing circuit and utilizing the elastomeric dome-cap sensor 28 of FIG. 9 as a pressure-sensitive variable-conductance sensor in combination with a meter 26. The needle of meter 26 is shown moved somewhat to the right to indicate compressive force being applied to active element 14 with dome-cap 12 depressed as shown in FIG. 11 wherein the sensor is in an activated state. Again, meter 26 is only for illustrative purposes, as such a meter with needle is not anticipated as being required in a mouse in accordance with the invention.

FIG. 11 shows a median cross section view of an elastomeric dome-cap sensor with the sensor shown in the activated state or condition with the dome-cap 12 depressed and representing the dome-cap sensors of either FIG. 7 or FIG. 9 in the activated state, i.e., activated state meaning with the active element 14 under a degree of compression from the depressed dome-cap 12. Deactivated state generally meaning the active element 14 is not being compressed by the dome-cap 12.

Figure 12:
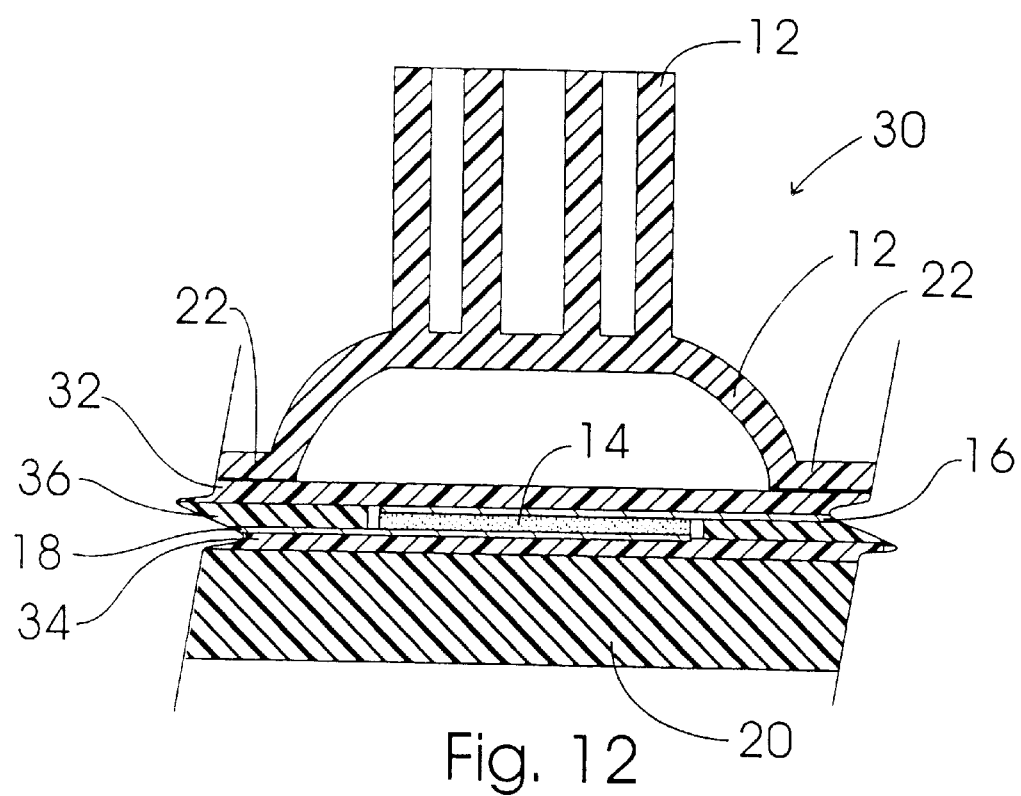
FIG. 12 shows a median cross section view of a sensor which uses an elastomeric injection molded one-piece dome-cap as could be used in a desktop mouse in accordance with the invention. The active element is shown sandwiched between two membrane sheets which are separated by a center membrane sheet having a hole containing the active element. The active element is shown beneath the underside center of the raised one-piece injection molded elastomeric dome-cap and below or outside of the dome-cap. In this illustration, the active element is shown neither carried by the dome-cap nor within the confines of the dome-cap.

FIG. 12 shows a median cross section view of an elastomeric dome-cap sensor 30 in the deactivated state or condition with active element 14 sandwiched between two non-conductive flexible membrane sheets 32, 34 which are separated by a center membrane sheet 36 which includes a hole therein filled with active element 14. The membrane sheets are shown atop a stiff base 20 beneath the underside center of the raised dome-cap 12 which is mounted atop the upper most membrane sheet. Two proximal conductive elements 16, 18 are shown between the membrane sheets 32, 34 and contacting opposite sides of active element 14. The proximal conductive elements 16, 18 can be printed conductive ink on membranes 32 and 34. Active element 14 which is not carried by dome-cap 12 is shown beneath the underside center of the raised dome-cap 12 and outside of, or not within dome-cap 12, but rather is below the bottom surface of flange 22. The dome-cap 12 can be manually depressed to move toward base 20 to apply pressure on the nearest membrane sheet 32 which will flex and transfer depressive force into active element 14 which will alter it's conductivity relative to the degree of compression or force thereon, thus altering the conductivity through active element 14 between proximal conductive elements 16, 18.

FIG. 12 additionally shows that dome-cap 12 can be manufactured with uniform wall thickness such as to accommodate certain materials which mold and perform in an improved manner when kept uniform in thickness, as opposed to those embodiments shown in FIGS. 7, 9 and 11 which have an upper portion of much greater thickness than the lower portion of the dome-cap 12.

The embodiment of FIG. 12 shows active element 14 sandwiched between conductive elements 16 and 18 as taught in the R. J. Mitchell U.S. Pat. No. 3,806,471 issued Apr. 23, 1974, and further sandwiched between membrane sheets as shown in the F. Eventoff U.S. Pat. No. 4,315,238 issued Feb. 9, 1982 as a bounceless On/Off switch. My addition of the elastomeric injection molded one-piece dome-cap 12 in this embodiment creates a novel sensor with some, but not all, of the above discussed advantages afforded to an injection-molded dome-cap sensor having analog or pressure sensitive properties. While the novel embodiment of FIG. 12 is or would be functional with the present invention, it is not the most preferred sensor discussed herein for certain reasons such as: this embodiment is not the lowest cost manufacturing technology discussed herein, or the easiest to manufacture, or the best performing sensor embodiment described herein.

From the above, it should already be appreciated that the present invention provides for ease of changeover by manufactures who currently make desktop mice for computer control which include housings with circuit boards therein, elastomeric dome-cap sensors associated with the circuit boards and used for scrolling control, the housings structured to allow access or the like to the dome-caps to allow depression thereof either directly with the finger or through additional button structures 103, and rotatable balls in-part exposed for rotation relative to the housing for pointer control. Following the herein teachings, in the most minimal case to structure a desktop mouse in accordance with the invention, such manufacturers will only need to apply new or modified circuitry on the circuit boards capable of reading any one of at least three readable states (electric states or values) or many more representing depression of the dome-cap sensor associated with window or screen scrolling. The at least three states of the dome-cap and active element (sensor) can represent at least: 1) no pressure, 2) low pressure, and 3) high pressure applied to the dome-cap and thus the active element and different level of conductivity thereof. The three states are defined, for example, by the different levels of conductance of the active element such as when under no pressure and essentially deactivated, and when under compressive pressure at a first level and when under compressive pressure at a second level. The first and second levels can be first and second scrolling speeds or rates. The new or modified circuitry needs to be capable of reading any one of the at least three readable states of the dome-cap sensor 10, 28 or 30 for example. Such readable states, for example, can be: 1) a first level of electrical resistance being relatively high resistance or open across the proximal conductive elements indicating the dome-cap as raised; 2) a second level of electrical resistance being less than the first level but allowing current flow between the proximal conductive elements and being indicative of the dome-cap being lightly depressed and lightly compressing the active element 14; and 3) a third level of electrical resistance being less than the first and second levels and allowing current flow between the proximal conductive elements 16, 18 and being indicative of the dome-cap being depressed and compressing (applying force) active element 14 more firmly or with greater pressure compared to the second level or state. Each state or value can be associated with an individual bit or digital assignment, although if the no pressure or first pressure level of the analog sensor is treated as an open switch not requesting action, typically there would not be a need for a function-control signal to be sent from the desktop mouse 100 or 200 to a host computer for this first state, but second and third states would be associated with a bit or digital assignment which resulted in a control signal or scroll control signal being communicated from the mouse 100 or 200 to the host computer.

Analog to digital conversion connotes transferring the variable or different electrical states of the active element in a manner requiring a minimum necessary or required number of digital bits to describe a maximum possible number of variable states. The conversion requiring at least two digital bits or equivalent wording thereto, means that the active element 14, being variably conductive, i.e., variably resistive or variably rectifying, can be described as having more than only two possible states of electrical conductivity, and those states can be described with digital information (bits). The number of bits necessary (required) to describe a specific possible number of states is well known by those skilled in the art, as the possible described states is a factor of the bits required to describe such states. For example: two different states require at least one digital bit to describe, On or OFF, the bit is a zero or a one; three different states require at least two digital bits to describe; and three bits are required to describe a minimum of 5 states; to describe a somewhat smoothly variable active element having 256 states requires at least eight bits of digital information, etc. The term "storing" means that a representative value of a read state of the active element 14 is at least stored in some register at some time within the digital electronics processing the status of the active element 14.

The conductive pill or active element 14 of typical prior art elastomeric dome-cap sensors is variably conductive and pressure-sensitive to a degree quite useful in an analog sensing circuit of electronic circuitry of an improved desktop mouse as herein disclosed. Such prior art active elements are believed to be primarily carbon within an elastomeric or rubbery binder. However, within the scope of the invention, variable conductance can be achieved with other materials having either variable resistive properties or variable rectifying properties. For the purpose of this disclosure and the claims, variable-conductance and equivalents thereto means either variably resistive or variably rectifying. Pressure-sensitive variable-conductance material 54 as herein used particularly in reference to FIGS. 13–15 (to be described below) is such material. Active element 14 is also pressure-sensitive variable-conductance material. Material having these qualities can be achieved utilizing various chemical compounds or formulas some of which I will herein detail for example. Additional information regarding such materials can be found in the R. J. Mitchell patent describing various feasible pressure-sensitive variable-conductance material formulas which can be utilized.

While it is generally anticipated that variable resistive type materials for defining active element 14 or material 54 are optimum for use in pressure sensor(s), variable rectifying materials are also usable within the scope of the present invention.

An example formula or compound having variable rectifying properties can be made of any one of the active materials copper oxide, magnesium silicide, magnesium stannide, cuprous sulfide, (or the like) bound together with a rubbery or elastomeric type binder having resilient qualities such as silicone adhesive or the like.

An example formula or compound having variable resistive properties can be made of the active material tungsten carbide powder (or other suitable material such as molybdenum disulfide, sponge iron, tin oxide, boron, and carbon powders, etc.) bound together with a rubbery or elastomeric type binder such as silicone rubber or the like having resilient qualities. The active material tungsten carbide powder may be in proportion to the binder material in a rich ratio such as 90% active material to 10% binder by weight, but can be varied widely from this ratio dependant on factors such as voltages to be applied, level or resistance range desired, depressive pressure anticipated, material thickness of the active element, surface contact area between the variable-conductance material and conductive elements of the circuit, binder type, manufacturing technique and specific active material used. I have found that tungsten carbide powder bound with a rubbery or elastomeric type binder such as silicone rubber or the like provides a wider range of varying resistance than the typical carbon pill or active element 14 of the prior art dome-cap switches and thus may be preferred particularly for applications requiring high resolution or low power consumption. Also, the tungsten carbide based active element is more predictable in it's pressure sensitive varying conductivity over a wider temperature range than the typical carbon based active element used in prior art dome-cap switches.

Figure 13:
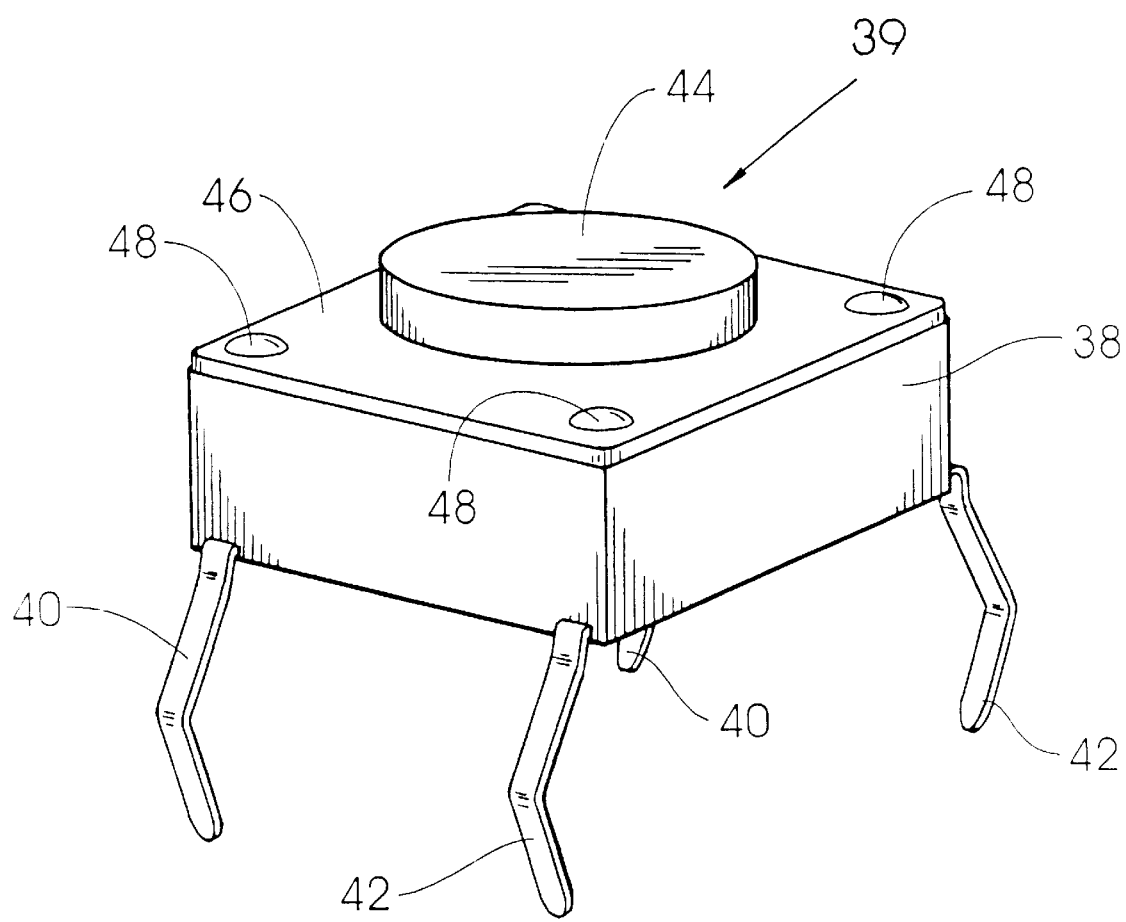
FIG. 13 shows a flat mount sensor or switch package which is structured in a novel manner inside the sensor and as could be used in a desktop mouse in accordance with the invention.

FIG. 13 shows a flat mount sensor package 39 which outwardly appears as many prior art switches or sensors. Sensor 39 is a novel analog sensor capable of variable conductance through at least three readable states, and such a sensor is not known to exist in the prior art. The analog sensor 39 of FIGS. 13–15 can be used in a desktop mouse in accordance with the present invention. FIG. 13 shows four extensions external of housing 38 which those skilled in the art understand in regards to prior art switch packages are in effect two conductive elements 40, 42 wherein two of the extensions represent portions of first conductive element 40 external to housing 38, and the other two extensions represent portions of second conductive element 42; as is common in many prior art switch packages for allowing increased strength and options in mechanical and electrical connecting, and such multi-extensions external of housing 38 for each conductive element 40, 42 can also be used on sensors 39 used with the present invention. Housing 38 is typically of non-conductive plastics, and the two conductive elements 40 and 42 are typically highly conductive and of fairly constant conductivity; the conductive elements 40, 42 each fixed to housing 38 and in-part within housing 38 and in-part exposed external of housing 38. Conductive elements 40, 42 are herein sometimes referred to as first conductive element 40 and second conductive element 42, and are typically formed via stamping and bending of sheet metal. Typically, housing 38 is of non-conductive plastics molded around portions of conductive elements 40 and 42 so as to retain the conductive elements in proper location to housing 38. Also shown in FIG. 13 is a housing closing plate 46 and retaining studs 48 at the corners for retaining plate 46 on the balance of housing 38, and depressible button or button-like actuator 44 extending from within housing 38 through an opening in plate 46.

Figure 14:
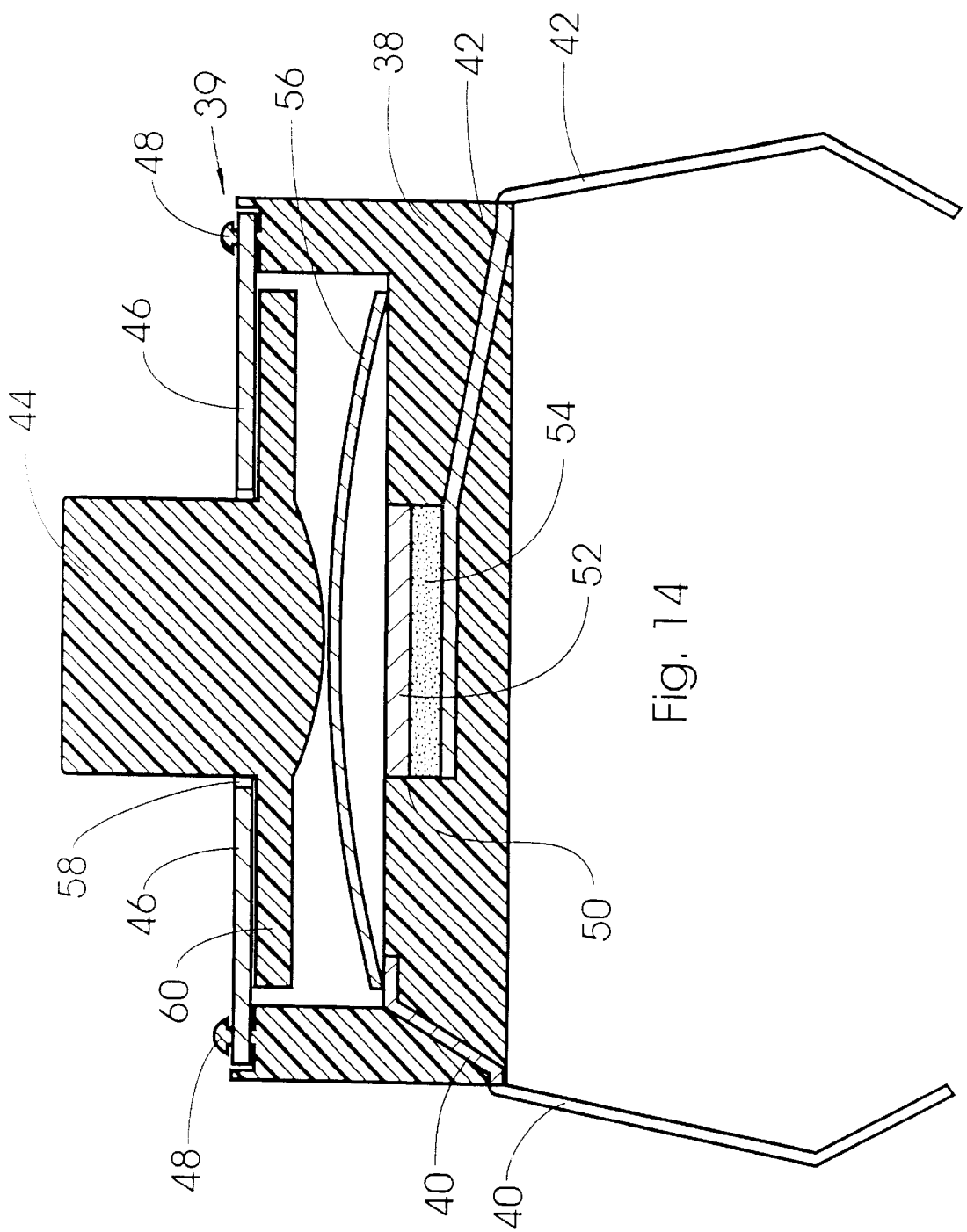
FIG. 14 shows a median cross section view of the FIG. 13 flat mount sensor package structured to be a pressure-sensitive variable-conductance sensor and useful with the present invention.
Figure 15:
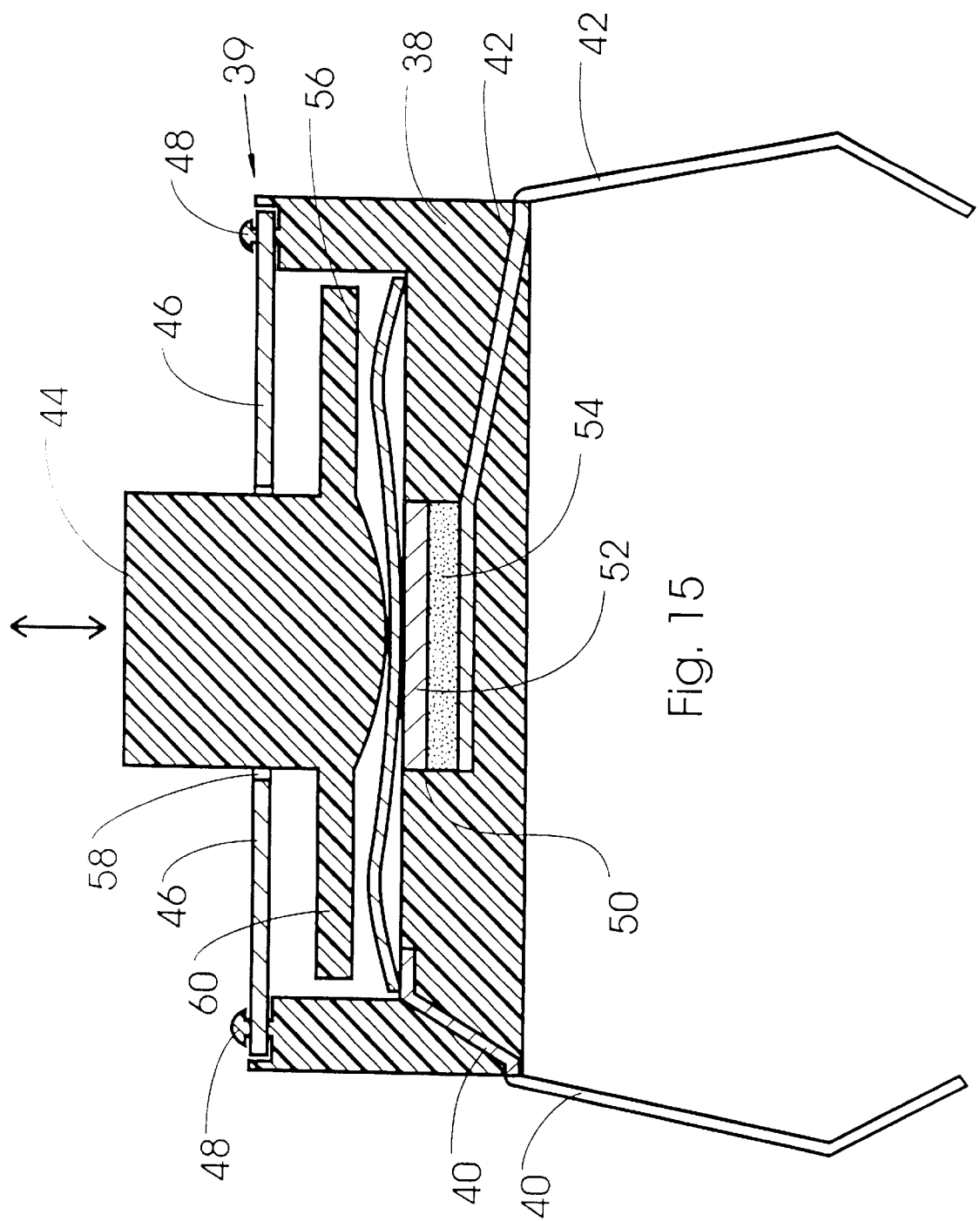
FIG. 15 shows a median cross section view of the sensor embodiment of FIGS. 13–14 in a depressed or actuated condition.

FIG. 14 shows a median cross section view of the package sensor 39 of FIG. 13 and showing pressure-sensitive variable-conductance material 54 within a recess or well 50 inside housing 38 contacting second conductive element 42 and capped by an optional conductive cap 52. The FIG. 14 sensor 39 includes the optional conductive cap 52, which can be used to define a lamination of pressure-sensitive variable-conductance material 54 onto conductive sheet material and then cut-out with a hole punch prior to insertion in to the well 50 of the housing of the sensor package. Conductive cap 52 being atop pressure-sensitive variable-conductance material 54 is effectively closing pressure-sensitive variable-conductance material 54 within well 50. Conductive cap 52 should either be flexible so as to be able to bow into pressure-sensitive variable-conductance material 54, or loose fit in well 50 so as to be able to move in it's entirety into pressure-sensitive variable-conductance material 54 when pressure is applied thereto by snap-through dome-cap 16 to be detailed. Conductive elements 40, 42, are shown separated from one another within housing 38 and in a normally open state or circuit, being separated by space and the insulating material defining housing 38. An end portion of first conductive element 40 within housing 38 is shown positioned in constant contact with a side edge of dome-cap 56. Dome-cap 56 is a circular resilient disk having a domed or concavo-convexed shape and typically made of electrically conductive metal. Dome-cap 56 is shown positioned within a large recess or the interior open space defined by housing 38 and between depressible button or actuator 44 and conductive elements 40, 42. As shown in FIG. 15, in this sensor 39 embodiment, depression of actuator 44 sufficiently causes dome-cap 56 to bow downward causing a center portion of dome-cap 56 to contact conductive cap 52. If cap 52 is not used, dome-cap 56 would contact material 54 directly. Well 50 is also optional. The contacting of the center portion of dome-cap 56 with conductive cap 52 causes an electrical bridging or closing between conductive elements 40, 42 through pressure-sensitive variable-conductance material 54, conductive cap 52 and conductive dome-cap 56, the degree of conductivity determined by the degree, level or amount of pressure applied to pressure-sensitive variable-conductance material 54 by way of pressure applied to actuator 44, and thus at least three readable states can readily be obtained with this packaged analog sensor 39 embodiment. Dome-cap 56 when pressed against by way of depressive pressure applied to actuator 44 bows toward conductive cap 52 with a degree of resistance to moving, the resistance begins relatively low and increases toward a snap-through threshold wherein at the snap-through threshold dome-cap 56 "snaps-through" and moves further downward. A snap or click (tactile sensation) can be felt and in some applications heard (user discernable tactile feedback) as dome-cap 56 snaps-through its threshold. The snap-through dome-cap 56 being of resilient design, returns to a raised position off of conductive cap 52 when actuator 44 is no longer depressed, and thus sensor 39 is a momentary-On analog type sensor capable of outputs of many different readable states. Also, the resiliency of the metal dome-cap 56 is used as the return spring for depressible actuator 44, holding the actuator 44 raised or outward when not depressed by an external force such as a human finger. Depressible actuator 44 is shown protruding through opening 58 in plate 46, and is prevented from passing completely through opening 58 by a flange 60 connected to actuator 44 and too large to pass through opening 58. The portion of depressible actuator 44 which is external of housing 38 can be of numerous sizes, shapes and lengths, for example to accommodate the attachment of or contacting of extending and/or enclosing members such as buttons, or to serve directly as a surface against which a finger can be applied to depress the actuator 44.

FIG. 15 shows a median cross section view of the packaged sensor 39 embodiment of FIGS. 13–14 with actuator 44 depressed, such as it would be by a user's finger or thumb, to such a degree as to cause dome-cap 56 to impinge upon conductive cap 52 atop the pressure-sensitive variable-conductance material 54. The pressure applied to conductive cap 52 is transferred in pressure-sensitive variable-conductance material 54 and the conductance between circuit elements 40 and 42 is varied upon varied compressive pressure on material 54. Numerous variations of the analog sensor 39 of FIGS. 13–15 structure can be made, and such analog sensors can be used in a desktop mouse in accordance with the invention. Circuit elements 40 and 42 solder or otherwise electrically connected to circuitry of the desktop mouse, such as the circuitry of circuit board 111 allowing the packaged analog sensor 39 to interface with the circuitry and electronics of the mouse 100 or 200. Button-like actuator 44 while shown small in the portion thereof exposed external of the housing 38 so as to be placed underneath an exposed finger depressible button, can be made larger and re-shaped if desired, and exposed through a hole in the mouse housing for directly interfacing with a human finger.

Figure 16:
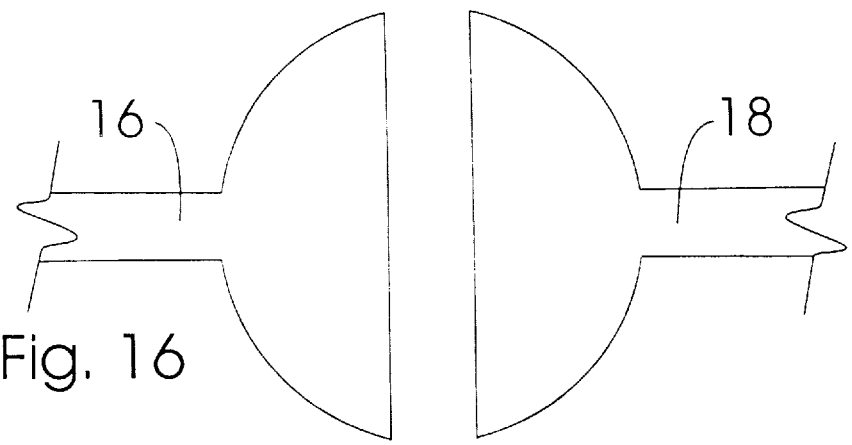
FIGS. 16–18 each show a top view of varied proximal conductive elements useful generally for interfacing between the active element of an elastomeric dome-cap sensor and a circuit board or circuit bearing membrane sheet or the like circuit bearing material.
Figure 17:
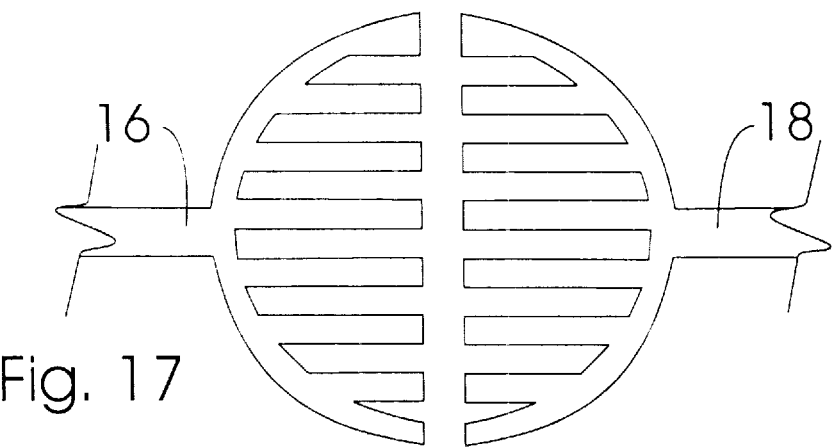
Figure 18:
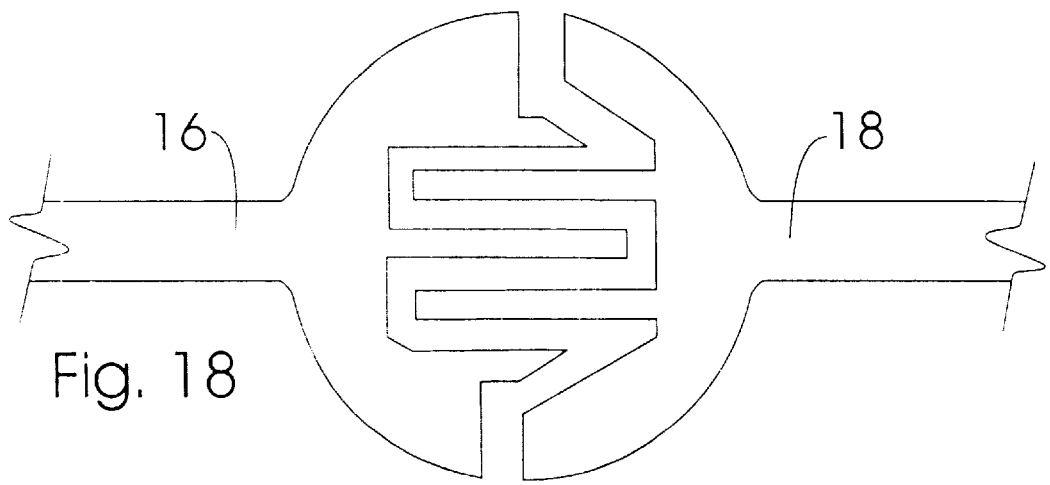

FIGS. 16–18 show a top view of two conductive elements 16, 18 in various proximal arrangements as they may be applied to a circuit board 111 in sensor embodiments useful with the present invention, particularly elastomeric dome-cap sensors wherein the active element 14 (or material 54) spans the two proximal conductive circuit elements 16, 18 to bridge the elements which are extensions of the circuitry of a circuit board such as discussed above in regards to circuit board 111. In this arrangement with circuit elements 16, 18, aligned to engage active element 14, the elastomeric dome-cap sensor electrically interfaces with the associated circuitry of the circuits of circuit board 111. A human digit, i.e., finger or thumb, can interface with the sensor as a whole by pressing, and with different amounts of force, the button surface of the button associated with the balance of the sensor, and thus interface with the circuitry of the mouse for user selection of function-control signals to be communicated to the host computer. FIG. 16 shows two conductive elements 16, 18 as two side-by-side plate-like pads. FIG. 17 shows two conductive elements 16, 18 as two side-by-side pads having opposed fingers. FIG. 18 shows two conductive elements 16, 18 as two side-by-side pads defined by interdigitated fingers.

Figure 19:
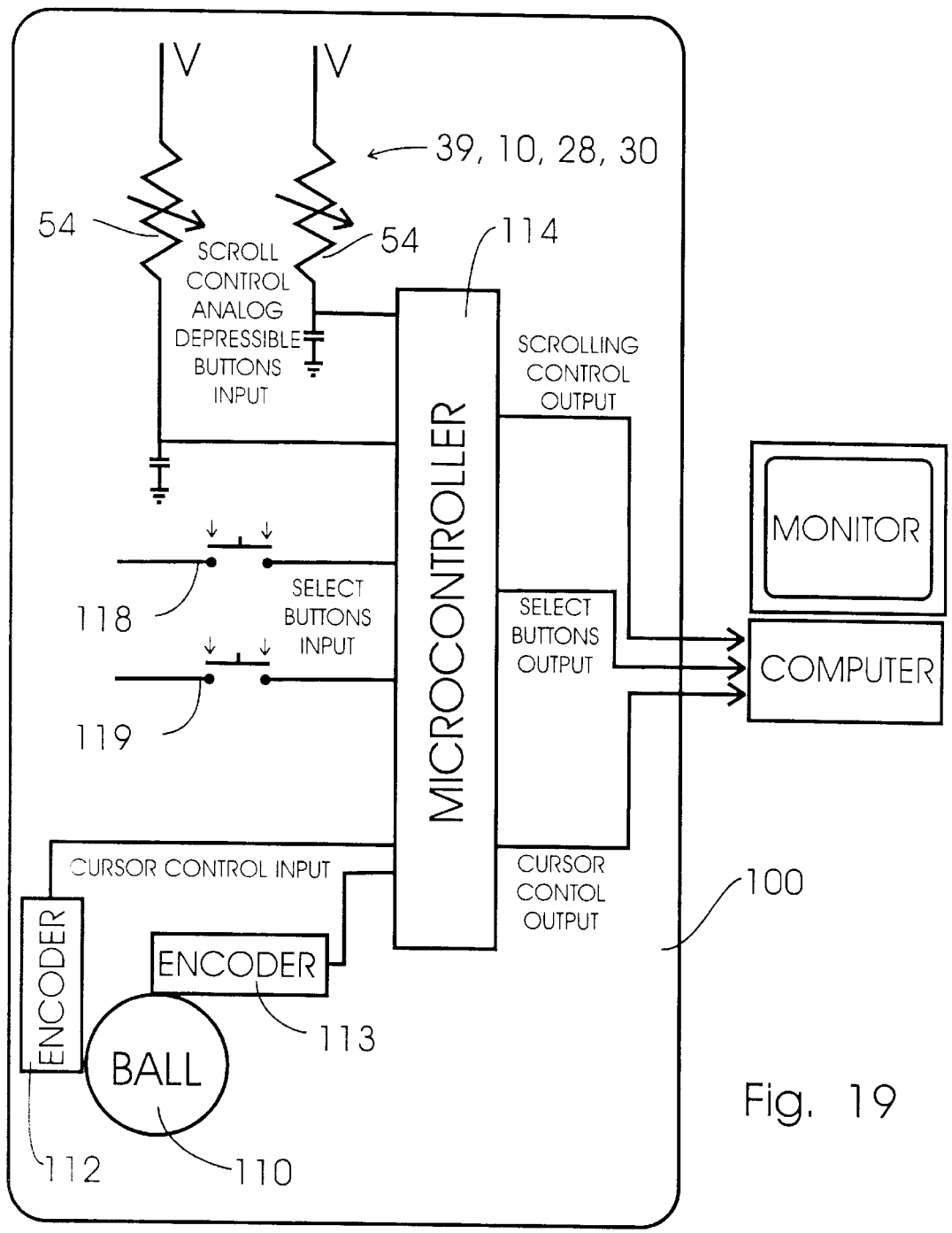
FIG. 19 shows an overview of some of the primary components of a desktop mouse in accordance with the invention.

FIG. 19 shows an overview of some of the primary components of desktop mouse 100 having a rotatable ball 110 read by encoders 112, 113 for pointer control, select buttons 118, 119, and inputs to microcontroller 114. The arrangement is the same for mouse 200 except mouse 200 would include two additional scroll control analog depressible buttons for the scroll right and left functions. In accordance with the present invention, device 100 also has pressure-sensitive variable-conductance material 54 as an active element of sensor types such as finger depressible analog scroll buttons or sensors 39, 10, 28, 30 for inputting data representing the analog value or current state to microcontroller 114. Microcontroller 114 outputs, such as through a serial port PS/2 or USB or the like, for output of screen scrolling control signals for at least two scroll rates or speeds, select button function-control signals and pointer control signals to a host computer with monitor.

Figure 20:
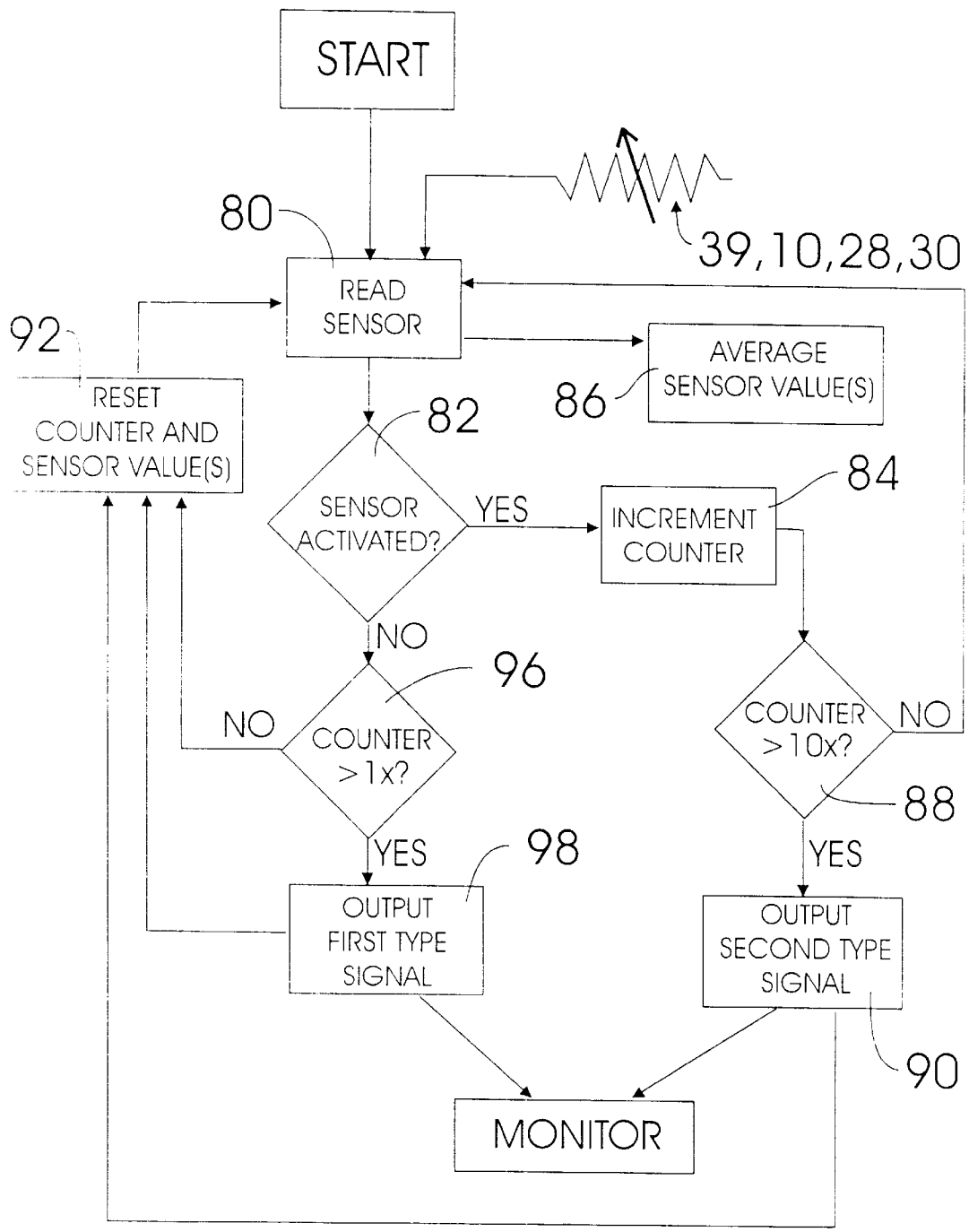
FIG. 20 shows a flow chart for achieving a dual role or dual output with a pressure-sensitive variable-conductance depressible button sensor.

FIG. 20 shows a pressure-sensitive variable-conductance depressible button sensor such as the dome-cap sensors of FIGS. 7 or 9, or the package sensor of FIGS. 13–15 and indicated as a variable resistor connected in a battery powered circuit including a counter with analog-to-digital conversion circuitry for storing and outputting digital information such as could be used with a dual role pressure-sensitive variable-conductance depressible button sensor in computer control mouse in accordance with the present invention. FIG. 20 being primarily regarding the "dual role" of the analog sensors in a mouse for computer control as mentioned above. Shown is a simplified flow chart, for example only, representing a program element for reading a single analog sensor and determining whether the output caused by a variable input depressible button will be either a first signal type such as an only On/Off signal type, or a second signal type such as a variable signal representative of differing levels of depressive pressure applied, both signal types being generated from a singular finger depressible button on the housing of the mouse, the button associated with a pressure-sensitive variable-conductance sensor for varying conductance through at least three readable states, and preferably many more states.

The flow chart demonstrates that the program first looks at variable resistor of the sensor 39, 10, 28, 30 or the like depending on which sensor is used, and reads 80 the sensor's current state. The program flow control then goes to decision 82 based on the question "is the sensor activated?" If the sensor is activated, a counter is incremented 84 indicating that the sensor has been read as activated. Additionally the sensor state or value is stored in a storage register(s) and averaged 86 (or equivalent) with any other previous read values. The counter value is read, and a decision 88 is made depending on the counter value, if the counter value is not sufficiently high, for example, ten reads of the sensor, then the sensor is read 80 again. If the counter value is sufficiently high, then the button has been held sufficiently long, for example, ¼ of a second or longer, and the second type signal is output 90 to the computer (or if the above processing is performed within the computer then the output would be to video output portions of the computer or monitor) representing the level of depressive pressure applied to the button and analog sensor 39, 10, 28, 30. The counter and storage register(s) are then cleared or reset 92. On the branch in which a first type signal would be output, at decision 82 "is the sensor activated?" if the answer is no, then the counter value is examined 96, if the counter value is not of a sufficient value, for example, at least more than one, then any previously stored sensor activation is considered spurious and discarded, the counter and storage values are reset 92 and the sensor is read 80 again. On the other hand, at decision 96, if the counter value is greater than one for example, then the button is deemed to have been pressed and immediately released so the first type signal is output 98 to the computer/video circuitry/monitor, the counter and storage register(s) are then reset, and the sensor is read 80 again. Thus, the dual role sensor output offers advantage in for example, moving back to a previous address or screen wherein initiation thereof is achieved by a quick press and release of the sensor button, and screens or windows may be scrolled at a desired speed by continuous user selected depressive pressure on a button of the mouse.

Figure 21:
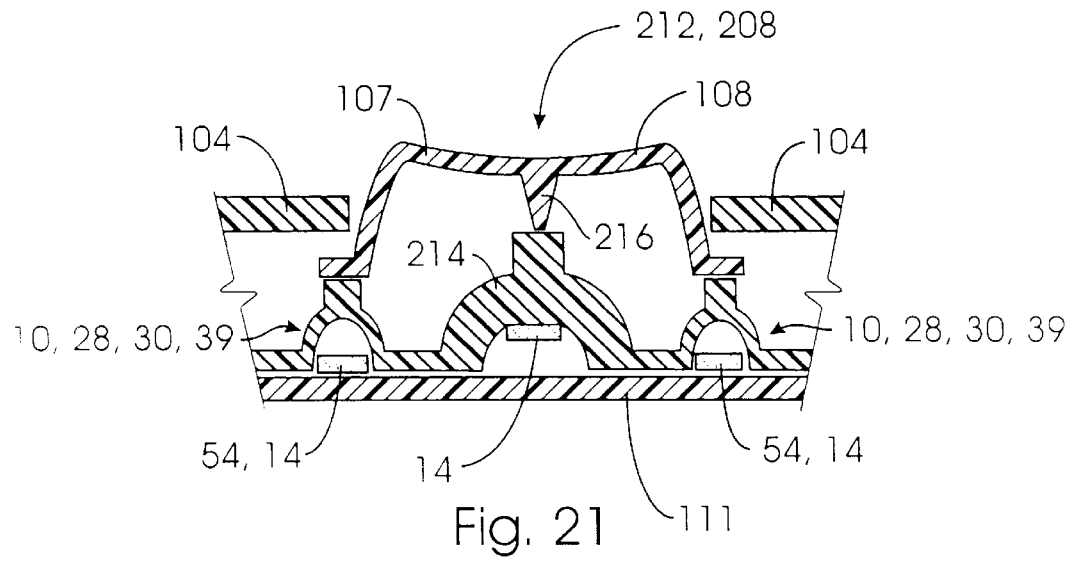
FIG. 21 shows a cross section view of depressible rocker button with a central depressible switch in a desktop computer mouse housing.
Figure 22:
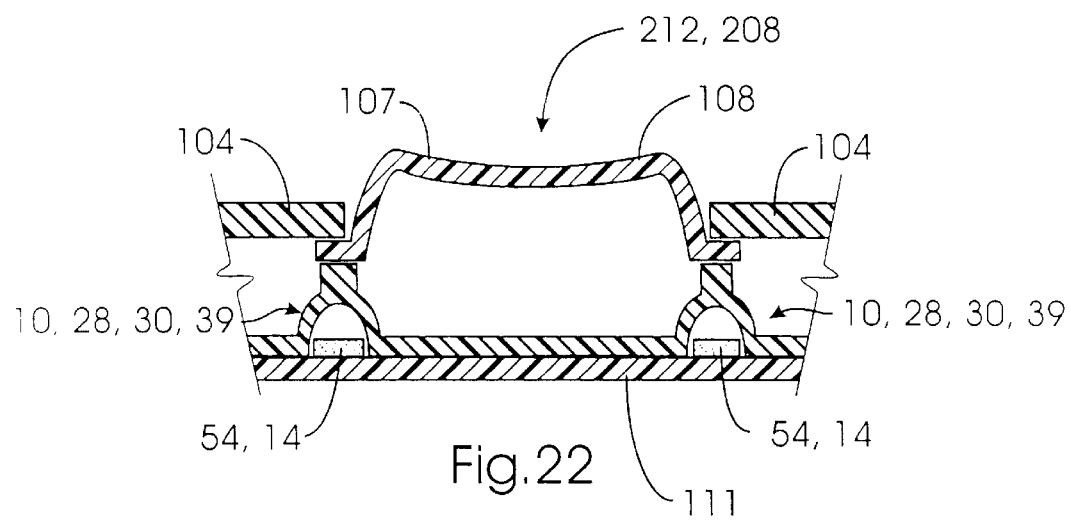
Figure 26:
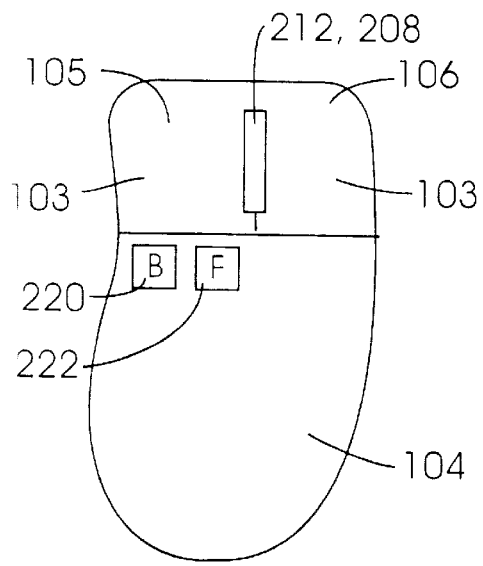
FIGS. 26–31 show top views of desktop computer mice having additional back and forward depressible buttons.
Figure 27:
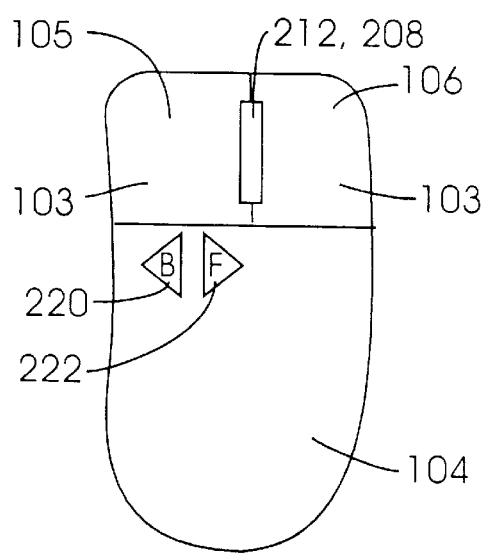
Figure 28:
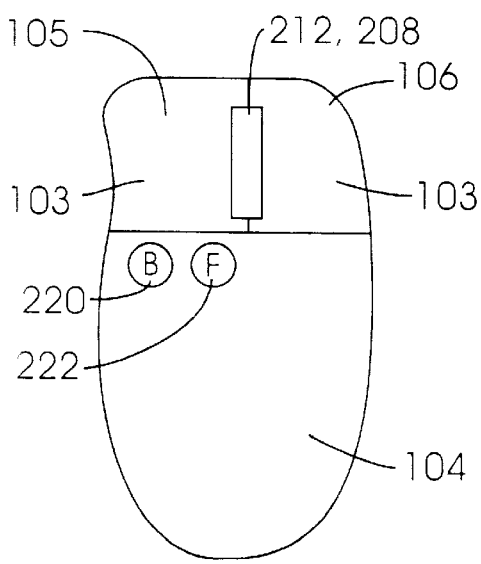
Figure 29:
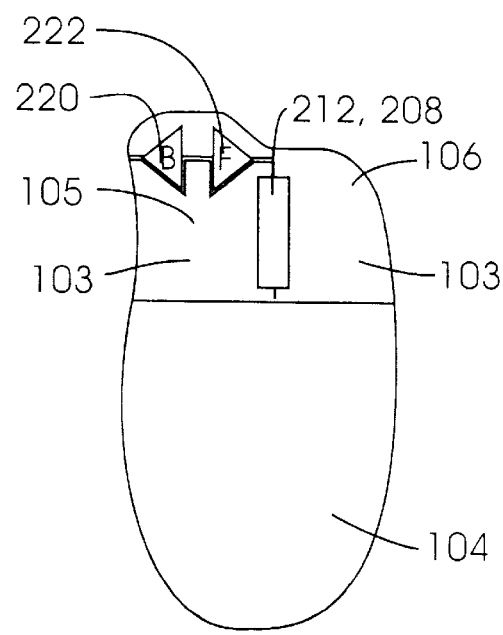
Figure 30:
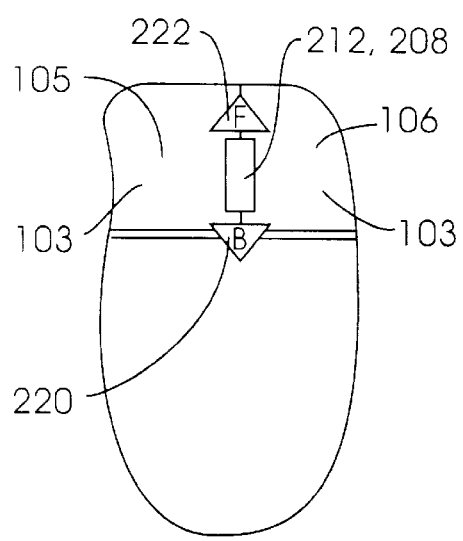
Figure 31:
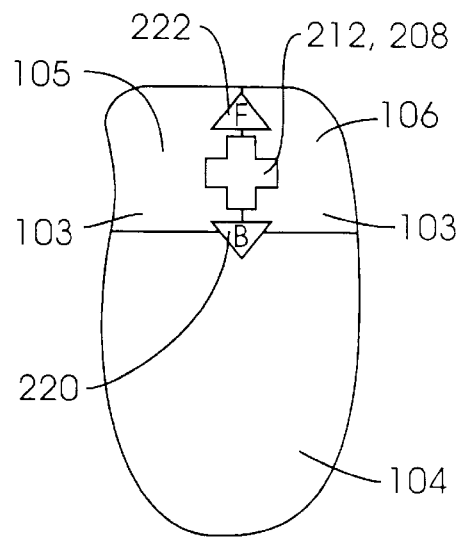

FIG. 21 shows a cross section view of depressible rocker button 212, 208 with a central depressible switch 214 which in this example is a thick-walled elastomeric dome-cap switch or sensor including an active element 14. Downward depending point 216 of rocker button 212, 208 rests upon sensor 214 in such a way that depression of button 212, 208 centrally causes point 216 to collapse sensor 214 to effect the electrical state of the sensor. Depression of button areas 107 and 108 can be achieved independently in a rocker manner and without actuating sensor 214.

FIGS. 22–25 show cross section views of depressible rocker buttons 212, 208 with sensors, such as 10, 28, 30, 39 in a desktop computer mouse housing 104. Rocker button 212, 208 can, because of a lack of a central pivot, be rocked at button area 107 (FIG. 23) or button area 108 (FIG. 24) to actuate only one of the opposing sensors 10, 28, 30, 39, at a time, or alternatively, the button can be centrally depressed to actuate more than one of the opposing sensors simultaneously (FIG. 25), such as for a achieving a third functionality.

Figure 32:
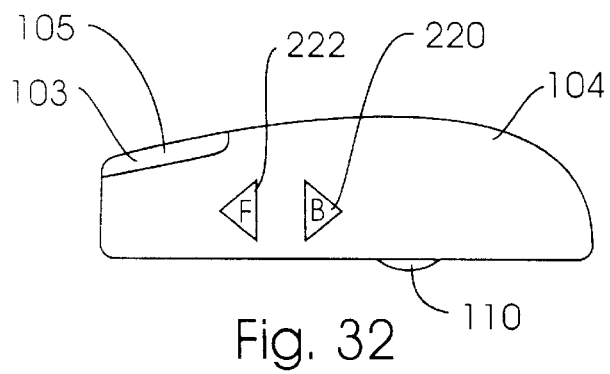
FIG. 32 shows a side view of a desktop computer mouse having additional back and forward depressible buttons.

FIGS. 26–31 show top views of desktop computer mice having additional back and forward depressible buttons, and FIG. 32 shows a side view of a desktop computer mouse, each having additional back 220 and forward 222 depressible buttons, such as may be used to advantage in operating as common back and forward software buttons such as used in Internet browsers and the like for changing backwards or forwards to other graphical imagery as may be in a sequential nature. Back and forward buttons 220 and 222 may operate in a limited manner as simple switches, and in a more advanced manner as analog depressible buttons, for example, analog depressible back and forward buttons easily allow variable control of video frames rate so that video imagery may be reversed slow or fast, and played forward at varied speeds determinable by user applied-depressive pressure on the button. Shown in FIGS. 26–31 are rocker buttons 212, 208 which may or may not be used in conjunction with back and forward buttons 220, 222. Back and forward buttons 220, 222 may be used with other desktop computer mice than described herein, such as for example computer mice with any type of cursor control technology and desktop mice having a roller type scrolling device, or no scrolling device.

From the drawings and above details it should be appreciated that the present invention can readily be described in numerous ways including the following descriptions provided for the sake of positive clarity and which reiterate certain details, provide, expand on and combine other details.

For example, the invention from one view point is an improved desktop operated computer control device (desktop mouse) of the type having a rotatable ball for pointer control, and further of the type including a housing, electronic circuitry within the housing and coupled to communication means, wired or wireless, for communicating control signals from the electronic circuitry to a computer. The desktop control device or mouse further including a plurality of finger depressible buttons exposed on the housing and interfacing with sensors electrically connected with the electronic circuitry for allowing user selection of control signals communicated to a computer; at least two of the sensors each capable of providing at least three readable states of varied conductance, at least two states of the at least three readable states, (e.g., Off, and at least two states or values of ON) dependant upon depressive pressure applied to the variable-conductance sensors through depression of an associated finger depressible button;

wherein the improvement comprises:

the electronic circuitry including means for reading the at least three readable states and for producing a distinct control signal for each state of the at least two states. Such electronic circuitry including analog sensing circuitry and analog-to-digital conversion capabilities wherein distinct bit assignments are applied for each state of the at least two states, or a great number of states over a continuous spectrum of varied "On" states, the bit assignments defining distinct control signals such as for screen scrolling control signals, and used to determine different scrolling speed rates.

From another viewpoint the invention can be described as an improved desktop operated computer control device of the type having a rotatable ball for pointing control on a computer monitor, the control device further of the type including a housing, electrical power source means, i.e. power cord or battery for powering electronic circuitry, the electronic circuitry located within the housing, the electronic circuitry coupled to communication means, i.e., data cable or wireless transmitter, for communicating control signals from the electronic circuitry to a computer, a plurality of finger depressible buttons exposed on the housing and interfacing with sensors electrically connected with the electronic circuitry for allowing user selection of control signals communicated to a computer;

wherein the improvements comprise:

at least two of the sensors each structured to provide at least three readable states of varied conductance, the states dependant upon depressive pressure applied individually to the sensors of the at least two sensors;

the electronic circuitry including means for reading the at least three readable states and for producing scroll control signals representative of each of at least two states of the at least three readable states;

a first sensor of the at least two sensors, the first sensor associated with a first button of the finger depressible buttons, the first button variably depressible to allow applying varied depressive pressure to the first sensor, the first sensor connected to the electronic circuitry, the electronic circuitry for reading the at least three readable states, (e.g., Off, and at least two states or values of ON) and producing at least two different scroll-up type signals as the scroll control signals;

a second sensor of the at least two sensors, the second sensor associated with a second button of the finger depressible buttons, the second button variably depressible to allow applying varied depressive pressure to the second sensor, the second sensor connected to electronic circuitry, the electronic circuitry for reading the at least three readable states, (e.g., Off, and at least two states or values of ON) and producing at least two different scroll-down type signals as the scroll control signals.

From another viewpoint, the present invention can be described as an improved method of controlling window scrolling of a computer using a desktop operated computer control device (desktop mouse) of the type having a rotatable ball for pointer control, the control device further of the type including a housing, an electrical power source connecting to electronic circuitry within the housing, the electronic circuitry coupled to communication means such as conductor cords or wireless links for communicating control signals from the electronic circuitry to a computer, a plurality of finger depressible buttons exposed on the housing and interfacing with sensors electrically connected with the electronic circuitry for allowing user selection of control signals communicated to a computer; the control device further of the type wherein a user depresses a scroll control button of the buttons to activate a scroll control signal related to the depressed button, and releases the depressed button to deactivate the scroll control signal;

wherein the improvement comprises:

depressing, by the user, the scroll control button with any user selectable pressure level of a plurality of user selectable pressure levels, the user selectable pressure levels associated with various distinct scroll control signals defining different scroll rates (speeds), whereby the user controls screen scrolling rate by way of selecting the pressure applied to the scroll control button, preferably wherein increasing pressure applied to the scroll control button increases scrolling rate, and decreasing pressure applied to the scroll control button by the user is for decreasing scrolling rate.

From still another viewpoint, the present invention can be described as a method of manufacturing an improved desktop operated computer control device of the type having a rotatable ball for pointer control including the known prior art steps of: molding a housing; installing means for receiving a power source; installing electronic circuitry within the housing and connected to the power source; connecting communication means, conductive cords or wireless linking, to the electronic circuitry for communicating from the control device to a computer; installing a rotatable ball; connecting to the electronic circuitry means for sensing rotation of pointer control ball for pointer control; installing a plurality of finger depressible buttons positioned for bearing on sensors electrically connected with the electronic circuitry; the electronic circuitry optionally for reading a plurality of the sensors as sensors having only two readable values, such as the right and left select sensor buttons; and further including the novel combined steps of:

installing pressure-sensitive variable-conductance sensors activated by depression of finger depressible buttons, the variable-conductance sensors structured to provide at least three readable values, the values dependant upon depressive pressure applied to the pressure-sensitive variable-conductance sensors;

installing circuitry such as analog sensing circuitry for reading an immediate value of the at least three readable values of the pressure-sensitive variable-conductance sensors, and for communicating from the control device (desktop mouse) to a computer data representative of the immediate value, whereby improved desktop device is manufactured for communicating data representative of the depressive pressure applied to the pressure-sensitive variable-conductance sensors.

Although I have very specifically described the preferred structures and best modes of the invention, it should be understood that the specific details are given for example to those skilled in the art. Changes in the specific structures and methods described and shown may clearly be made without departing from the scope of the invention, and therefore it should be understood that the scope of the invention is not to be overly limited by the specification and drawings given for example, but is to be determined by the broadest possible and reasonable interpretation of the appended claims.

I claim:

1. An improved desktop operated computer control device of the type having a rotatable ball for pointing control, said control device further of the type including a housing, electronic circuitry within said housing and coupled to communication means for communicating control signals from said electronic circuitry to a computer, a plurality of finger depressible buttons exposed on said housing and interfacing with sensors electrically connected with said electronic circuitry for allowing user selection of control signals communicated to a computer; at least two of said sensors each capable of providing at least three readable states of varied conductance, at least two states of said at least three readable states dependant upon depressive pressure applied to the variable-conductance sensors through depression of an associated button;

wherein the improvement comprises:

said electronic circuitry including means for reading said at least three readable states and for producing a distinct control signal for each state of said at least two states, the distinct control signals are screen scrolling control signals used to determine scrolling speed rates, whereby a pointer controlled by said control device is not required to be located on a scrolling elevator showing on a monitor.

2. An improved desktop operated computer control device according to claim 1 wherein said at least two of said sensors are analog sensors each including pressure-sensitive variable-conductance material.

3. An improved desktop operated computer control device of the type having a rotatable ball for pointing control, said control device further of the type including a housing, electronic circuitry within said housing and coupled to communication means for communicating control signals from said electronic circuitry to a computer, a plurality of finger depressible buttons exposed on said housing and interfacing with sensors electrically connected with said electronic circuitry for allowing user selection of control signals communicated to a computer;

wherein the improvements comprise:

at least two of said sensors are analog sensors each including pressure-sensitive variable-conductance material to provide at least three readable states of varied conductance, said states dependant upon depressive pressure applied to the pressure-sensitive variable-conductance material;

said electronic circuitry including means for reading said at least three readable states and for producing a distinct control signal for each of at least two states of said at least three readable states, whereby said control device outputs the distinct control signal regardless of a pointer position on a display.

4. An improved desktop operated computer control device according to claim 3 wherein the distinct control signals are screen scrolling control signals, and are used to determine scrolling speed rates.

5. An improved desktop operated computer control device of the type having a rotatable ball for pointing control on a computer monitor, said control device further of the type including a housing, electrical power source means for powering electronic circuitry, said electronic circuitry located within said housing, said electronic circuitry coupled to communication means for communicating control signals from said electronic circuitry to a computer, a plurality of finger depressible buttons exposed on said housing and interfacing with sensors electrically connected with said electronic circuitry for allowing user selection of control signals communicated to a computer;

wherein the improvements comprise:

at least two of said sensors are analog sensors including pressure-sensitive variable-conductance material, each said analog sensor structured to provide at least three readable states of varied conductance, said states dependant upon depressive pressure applied individually to the sensors of said at least two sensors;

said electronic circuitry including means for reading said at least three readable states and for producing scroll control signals representative of each of at least two states of said at least three readable states;

a first sensor of said at least two sensors, said first sensor associated with a first button of said finger depressible buttons, said first button variably depressible to allow applying varied depressive pressure to said first sensor, said first sensor connected to said electronic circuitry, said electronic circuitry for reading said at least three readable states and producing at least two different scroll-up values as said scroll control signals;

a second sensor of said at least two sensors, said second sensor associated with a second button of said finger depressible buttons, said second button variably depressible to allow applying varied depressive pressure to said second sensor, said second sensor connected to said electronic circuitry, said electronic circuitry for reading said at least three readable states and producing at least two different scroll-down values as said scroll control signals, whereby a pointer controlled by said control device is not required to be located on a scrolling elevator showing on a monitor.

6. An improved desktop operated computer control device in accordance with claim 5 wherein the first and second sensors include elastomeric dome-caps including the pressure-sensitive variable-conductance material carried by and within said dome-caps.

7. An improved desktop operated computer control device in accordance with claim 5 wherein the first and second sensors are each packaged sensors each comprising:

a package housing;

an electrically conductive concavo-convex resilient disk within the package housing;

two normally electrically separated proximal circuit elements at least in-part within the package housing;

a depressible button retained to the package housing and positioned such that depression of the button depresses said disk;

said pressure-sensitive variable-conductance material positioned within the package housing to receive compressive pressure thereagainst from and upon depression of said disk, said pressure-sensitive variable-conductance material further positioned to define at least a portion of an electrically conductive path defined between said proximal circuit elements upon depression of said disk, whereby said electrically conductive path is of varied electrical conductivity dependant upon an amount of compression applied to said pressure-sensitive variable-conductance material.

8. An improved computer control mouse of the type including a housing, electrical power source means for powering electronic circuitry, said electronic circuitry located within said housing, pointer control means coupled to said electronic circuitry for allowing user control of a pointer on a computer monitor, said electronic circuitry coupled to communication means for communicating output control signals from said electronic circuitry to a computer, a plurality of finger depressible buttons exposed on said housing and interfacing with sensors electrically connected with said electronic circuitry for allowing user selection of output control signals communicated to a computer;

wherein the improvements comprise:

at least one of said sensors structured as a pressure-sensitive variable-conductance sensor for varying conductance through multiple readable states, said states dependant upon depressive pressure applied to a finger depressible button associated with said at least one of said sensors; and said electronic circuitry structured for reading said multiple readable states, and for communicating to a computer a first output control signal type, and a second output control signal type, communication of either one of the first and second output control signal types determined by an amount of time of depression of said button, and said second output control signal type further communicating data representing a depressive level of depressive pressure applied to said button.

9. An improved computer control mouse according to claim 8 wherein said first signal type is a previous address Back signal type, whereby a user is allowed to press and release said button and have activated the command to return along a most recently followed link.

10. An improved computer control mouse according to claim 9 wherein said second signal type is a variable rate screen scroll signal type, whereby a user is allowed to press and continuously hold said button to achieve a scrolling of data on a computer monitor screen.

11. An improved computer control mouse according to claim 9 wherein said second signal type is a activate menu of Back addresses signal type, whereby the user is allowed to press and continuously hold said button to achieve display of a selectable list of previously visited addresses.

12. An improved method of controlling window scrolling of a computer using a desktop operated computer control device of the type having a rotatable ball for pointing control, the control device further of the type including a housing, electrical power source means for powering electronic circuitry, said electronic circuitry located within said housing, said electronic circuitry coupled to communication means for communicating control signals from said electronic circuitry to a computer, a plurality of finger depressible buttons exposed on said housing and interfacing with sensors electrically connected with said electronic circuitry for allowing user selection of control signals communicated to a computer; said control device further of the type wherein a user depresses an analog scroll control button of said buttons to activate a scroll control signal related to the depressed button, and releases the depressed button to deactivate said scroll control signal;

wherein the improvement comprises:
depressing, by the user, said analog scroll control button with any user selectable pressure level of a plurality of user selectable pressure levels, the user selectable pressure levels associated with various distinct values of said scroll control signal, whereby the user controls screen scrolling rate by way of selecting the pressure applied to said analog scroll control button, and a pointer controlled by said control device is not required to be located on a scrolling elevator showing on a monitor.

13. An improved method of controlling window scrolling of a computer using a desktop operated computer control device according to claim 12 wherein the method further comprises
increasing pressure applied to said analog scroll control button for increasing scrolling rate.

14. An improved method of controlling window scrolling of a computer using a desktop operated computer control device according to claim 12 wherein the method further comprises
decreasing pressure applied to said analog scroll control button for decreasing scrolling rate.

15. A method of manufacturing an improved desktop operated computer control device of the type having a rotatable ball for pointing control including the known prior art steps of: molding a housing; installing means for receiving a power source; installing electronic circuitry within said housing and connected to said means for receiving said power source; connecting communication means to said electronic circuitry for communicating from said control device to a computer; installing a rotatable ball; connecting to said electronic circuitry means for sensing rotation of said ball for pointing control; installing a plurality of finger depressible buttons positioned for bearing on sensors electrically connected with said electronic circuitry; said electronic circuitry for reading a plurality of said sensors as sensors having only two readable values; and further including the novel combined steps of:
installing pressure-sensitive variable-conductance analog sensors positioned to be activated by depression of at least some buttons of said finger depressible buttons, said pressure-sensitive variable-conductance analog sensors structured to provide at least three readable values, said values dependant upon depressive pressure applied to said pressure-sensitive variable-conductance analog sensors;
installing circuitry for reading an immediate value of said at least three readable values of the pressure-sensitive variable-conductance analog sensors, and for communicating data representative of the immediate value from said control device to a computer,
whereby said improved device is manufactured for communicating data representative of the depressive pressure applied to said pressure-sensitive variable-conductance analog sensors regardless of the position of a pointer controlled by said computer control device.

16. A computer mouse for use with a computer, the computer running network browser software for visiting network addresses, said mouse having:
a housing; and
at least one user depressible surface exposed on said housing for communicating a first command signal to the computer, said first command signal being dedicated to moving the network browser software backward to a previously visited network address, whereby depression of said user depressible surface causes the network browser software to move backward to a previously visited network address without a requirement of a pointer controlled by said mouse having to be located on a browser software back button.

17. A computer mouse according to claim 16 further including a second user depressible surface for communicating a second command signal to the computer, said second command signal being dedicated to moving the network browser software to a forward address.

18. An improved computer mouse of the type including a housing, electrical power source means for powering electronic circuitry, said electronic circuitry located within said housing, pointer control means coupled to said electronic circuitry for allowing user control of a pointer on a computer monitor, said electronic circuitry coupled to communication means for communicating output control signals from said electronic circuitry to a computer, a plurality of finger depressible buttons exposed on said housing and interfacing with sensors electrically connected with said electronic circuitry for allowing user selection of output control signals communicated to a computer;

wherein the improvement comprises:
at least one of said buttons being a back button, depression of said back button causes reception of a back control signal by network browsing software initiating said software to display a previously viewed network address, said network browsing software recognizing said back control signal without a requirement of the pointer being located on the software back button displayed on the monitor.

19. An improved computer mouse according to claim 18 further including at least one of said buttons being a forward button, depression of said forward button causes reception of a forward control signal by network browsing software initiating said software to display a previously viewed network address, said network browsing software recognizing said forward control signal without a requirement of the pointer being located on the software forward button displayed on the monitor.

20. An improved method of using a computer mouse, said mouse having cursor control means for describing a cursor position on a display, and user activatable buttons,
wherein the improved use of said computer mouse includes the step of activating one of the buttons to send a back signal, regardless of the cursor position on the display, to network navigating software for displaying a previously visited address.

21. An improved method of using a computer mouse according to claim 20 further including a step of activating one of the buttons to send a forward signal, regardless of the cursor position on the display, to network navigating software.

22. An improved method of browsing or navigating a network using a computer mouse, said mouse having cursor control means for describing a cursor position on a display, and user depressible buttons, wherein the improved method includes the step of depressing one of the buttons to send a signal, regardless of the cursor position on the display, to network browsing or navigating software for commanding display of a previously visited address.

23. An improved method of browsing or navigating a network according to claim 22 further including a step of depressing one of the buttons to send a signal, regardless of the cursor position on the display, to network browsing or navigating software for commanding display of a most recent previously visited address.

24. A computer mouse according to claim 16 wherein the network navigation software navigates the Internet.

25. A computer mouse according to claim 16 wherein the computer has a display, and the mouse further includes a cursor controller for communicating cursor command signals to the computer, the cursor command signals instructing the computer to move a cursor on the display, said first command signal causing the network navigation software to move to the previously visited network address regardless of a current location of the cursor on the display.

26. A computer mouse according to claim 16, wherein the user depressible surface is located on a side of said housing.

27. A computer mouse according to claim 17, wherein the user depressible surfaces are located on a side of said housing.

28. A computer mouse according to claim 17 wherein the network navigation software navigates the Internet.

* * * * *

Adverse Decision in Interference

Patent No. 6,198,473, BRAD A. ARMSTRONG, COMPUTER MOUSE WITH ENHANCE CONTROL BUTTON(S), Interference No. 105,604, final judgment adverse to the patentee rendered November 10, 2008, as to claims 16-28.

(*Official Gazette,* September 1, 2009)